(12) United States Patent
Mori et al.

(10) Patent No.: US 7,161,711 B2
(45) Date of Patent: Jan. 9, 2007

(54) INFORMATION PROCESSING APPARATUS AND METHOD FOR CREATING PRINT DATA AND STORAGE MEDIUM

(75) Inventors: Yasuo Mori, Kanagawa (JP); Koji Nakagiri, Kanagawa (JP); Satoshi Nishikawa, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 740 days.

(21) Appl. No.: 09/924,724

(22) Filed: Aug. 9, 2001

(65) Prior Publication Data

US 2002/0026453 A1    Feb. 28, 2002

(30) Foreign Application Priority Data

Aug. 22, 2000  (JP)  ............................. 2000-251296

(51) Int. Cl.
 *G06F 15/00* (2006.01)
(52) U.S. Cl. ...................... 358/1.9; 358/1.16; 358/523; 358/1.1; 358/1.18; 715/525; 715/526; 715/527; 715/517; 715/530
(58) Field of Classification Search ................. 358/1.9, 358/1.15, 1.16, 523, 1.1, 1.18, 1.13, 1.14, 358/518, 504; 715/527, 530, 526, 517, 522, 715/525, 507; 235/375; 382/167; 399/193, 399/184, 187; 347/155
See application file for complete search history.

(56) References Cited

U.S. PATENT DOCUMENTS

| | | | | |
|---|---|---|---|---|
| 4,648,047 A | * | 3/1987 | Berkland et al. | ........... 358/1.13 |
| 4,763,167 A | * | 8/1988 | Watanabe et al. | ............ 347/155 |
| 5,006,890 A | * | 4/1991 | Ishida et al. | ................. 399/184 |
| 5,018,080 A | * | 5/1991 | Inoue | .......................... 358/1.15 |
| 5,732,197 A | | 3/1998 | Nakagiri | ..................... 395/110 |
| 5,802,259 A | * | 9/1998 | Sugai | ......................... 358/1.13 |
| 5,839,033 A | * | 11/1998 | Takahashi et al. | ........... 399/187 |
| 5,847,848 A | * | 12/1998 | Suzuki et al. | ................ 358/518 |
| 5,864,634 A | * | 1/1999 | Kurita | .......................... 382/167 |
| 5,923,013 A | * | 7/1999 | Suzuki et al. | ................ 235/375 |
| 5,995,985 A | * | 11/1999 | Cai | ............................. 715/507 |
| 6,094,552 A | * | 7/2000 | Haneda et al. | .............. 399/193 |

(Continued)

FOREIGN PATENT DOCUMENTS

EP         895184 A2 *  2/1999

OTHER PUBLICATIONS

U.S. Appl. No. 09/595,885, filed Jun. 20, 2000 (GAU 2624) (allowed).

(Continued)

*Primary Examiner*—Kimberly Williams
*Assistant Examiner*—Beniyam Menberu
(74) *Attorney, Agent, or Firm*—Fitzpatrick, Cella, Harper & Scinto

(57) ABSTRACT

When a preview of a job that combines data to be printed output from an application is presented, an information processing apparatus includes, for the purpose of presenting a preview considering the setting of each print job, an intermediate data conversion unit that converts print data created by the application to an intermediate code format and stores the converted intermediate code format data and processing conditions of the print data, an editing unit that edits the data converted to an intermediate code format or processing conditions of the print data, a data creation unit that creates print data and processing conditions that implement print processing different from the print data created by the application based on the edited data and a preview display control unit for displaying the print processing result in advance based on the created print data and processing conditions.

34 Claims, 33 Drawing Sheets

U.S. PATENT DOCUMENTS

| | | | |
|---|---|---|---|
| 6,101,513 A * | 8/2000 | Shakib et al. | 715/527 |
| 6,141,120 A * | 10/2000 | Falk | 358/504 |
| 6,181,436 B1 * | 1/2001 | Kurachi | 358/1.15 |
| 6,285,461 B1 * | 9/2001 | Fujii et al. | 358/1.18 |
| 6,411,400 B1 | 6/2002 | Mori | 358/1.2 |
| 6,417,931 B1 | 7/2002 | Mori et al. | 358/1.15 |
| 6,580,521 B1 | 6/2003 | Nishikawa et al. | 358/1.18 |
| 6,606,669 B1 | 8/2003 | Nakagiri | 719/327 |
| 6,616,359 B1 | 9/2003 | Nakagiri et al. | 400/582 |
| 6,661,530 B1 * | 12/2003 | Munetomo et al. | 358/1.15 |
| 6,671,066 B1 * | 12/2003 | Aikawa et al. | 358/1.18 |
| 6,678,066 B1 * | 1/2004 | Nakamura | 358/1.13 |
| 6,734,986 B1 | 5/2004 | Kuroi et al. | 358/1.16 |
| 6,788,427 B1 * | 9/2004 | Okigami | 358/1.15 |
| 6,804,018 B1 * | 10/2004 | Mochizuki | 358/1.14 |
| 6,809,833 B1 * | 10/2004 | Blair et al. | 358/1.16 |
| 6,842,262 B1 * | 1/2005 | Gillihan et al. | 358/1.15 |
| 6,847,466 B1 * | 1/2005 | Gazdik et al. | 358/1.15 |
| 2002/0052897 A1 | 5/2002 | Nishikawa et al. | 715/527 |
| 2002/0171871 A1 * | 11/2002 | Catt et al. | 358/1.18 |

OTHER PUBLICATIONS

U.S. Appl. No. 09/698,052, filed Oct. 30, 2000 (GAU 2624) (pending).

U.S. Appl. No. 09/703,687, filed Nov. 2, 2000 (GAU 2624) (allowed).

U.S. Appl. No. 09/703,692, filed Nov. 2, 2000 (GAU 2624) (pending).

U.S. Appl. No. 09/703,684, filed Nov. 2, 2000 (GAU 2624) (allowed).

* cited by examiner

FIG. 10

| |
|---|
| JOB IDENTIFIABLE ID ~1001 |
| JOB SETTING INFORMATION ~1002 |
| NUMBER OF JOB PHYSICAL PAGES ~1003 |
| 1ST PHYSICAL PAGE INFORMATION ~1004 |
| 2ND PHYSICAL PAGE INFORMATION ~1005 |
| · · · ~1006 |
| LAST PHYSICAL PAGE INFORMATION ~1007 |

FIG. 11

| | |
|---|---|
| TOTAL NUMBER OF PHYSICAL PAGES | ~1101 |
| TOTAL NUMBER OF LOGICAL PAGES | ~1102 |
| NUMBER OF COPIES | ~1103 |
| PRINTING BY SET NUMBER OF COPIES | ~1104 |
| FINISHING INFORMATION | ~1105 |
| ADDITIONAL PRINTING INFORMATION | ~1106 |

FIG. 12

| PHYSICAL PAGE NUMBER | ~1201 |
|---|---|
| PHYSICAL PAGE SETTING INFORMATION | ~1202 |
| NUMBER OF LOGICAL PAGES ASSIGNED TO PHYSICAL PAGE n | ~1203 |
| 1ST LOGICAL PAGE INFORMATION | ~1204 |
| 2ND LOGICAL PAGE INFORMATION | ~1205 |
| . . . | ~1206 |
| nTH LOGICAL PAGE INFORMATION | ~1207 |

ORIGINAL DATA → NEGATIVE IMAGE

ORIGINAL DATA  (1) INVERT WHOLE  (2) MIRROR WITHOUT CHANGING BINDING MARGIN POSITION

ORIGINAL DATA   (1) INVERT WHOLE   (2) INVERT PAGE BY PAGE

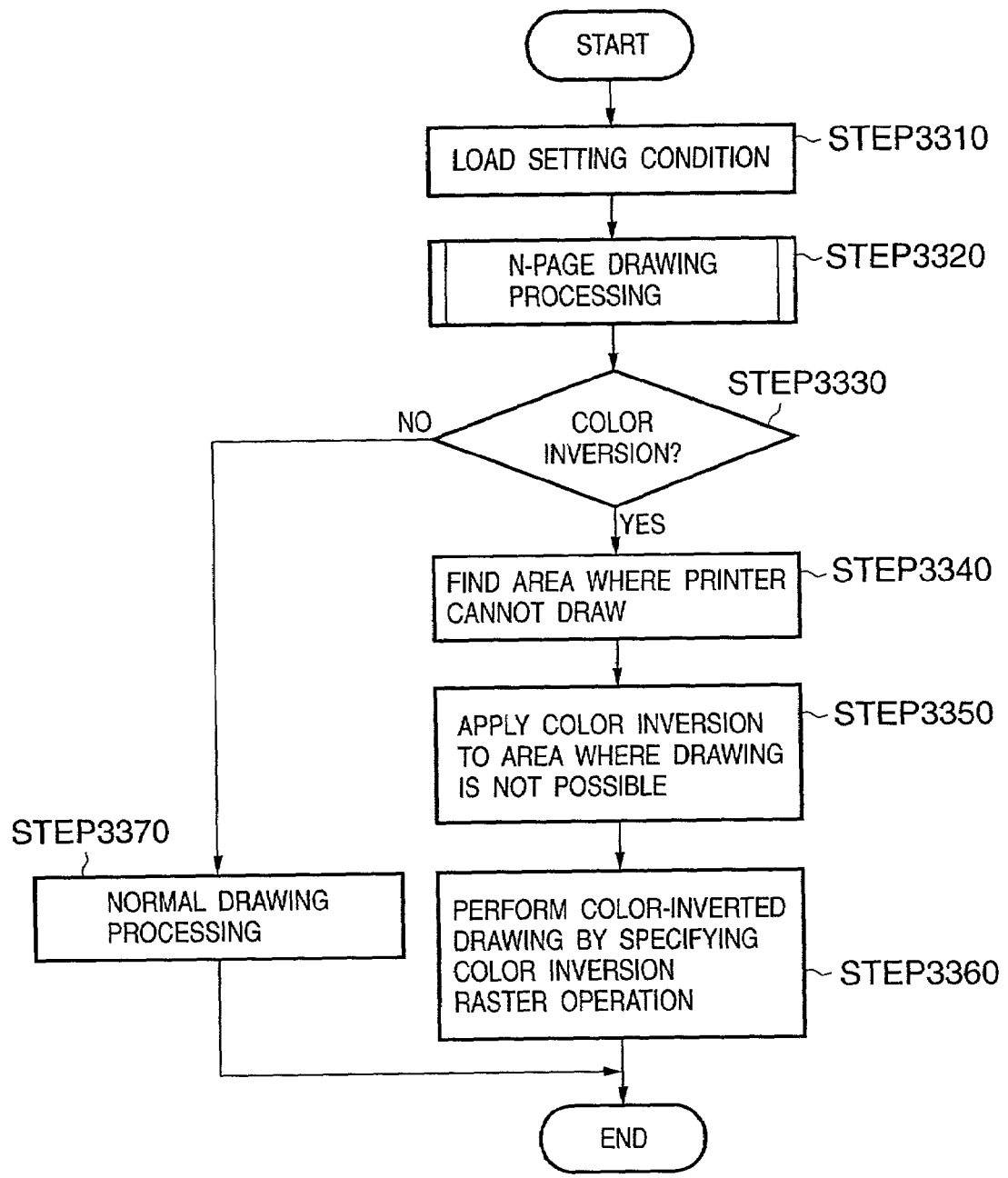

INFORMATION PROCESSING APPARATUS AND METHOD FOR CREATING PRINT DATA AND STORAGE MEDIUM

FIELD OF THE INVENTION

The present invention relates to an information processing apparatus and method for creating print data and storage medium, and more particularly, to an information processing apparatus and method that performs control in such a way as to display a preview that reflects the print setting of print data created by an application and a storage medium that stores a computer-readable program that executes the information processing method.

BACKGROUND OF THE INVENTION

When a client computer prints out a document (text data) created by an application, it has become possible to print data using a high-function printer driver by specifying various layouts in recent years. As the layout setting becomes more complicated, checking (previewing) output results on a host screen beforehand is an effective method to achieve desired printing results quickly and without waste.

It is a general practice that each application provides a preview function on the screen of the client computer (host computer) independently before printout, and in this case, it is possible to check the preview of the results of applying the layout function of the application on the screen.

However, according to the conventional method, it is not possible to check the layout function provided by a printing device such as a printer and a printer driver for the printer. Especially, it is not possible to preview special functions provided for the printer. For example, there is a problem that it is not possible to preview functions such as color-inverted (negative) printing, right/left inverted (mirrored) printing of a PS printer.

SUMMARY OF THE INVENTION

The present invention has been proposed to solve the conventional problems, and has as its object to make it possible to detect the settings of special functions of the printer from the print settings, simulate the printer functions on a client computer according to the settings and present a preview.

To attain the above object, the information processing apparatus and method and storage medium of the present invention are characterized by having the following configuration.

That is, the information processing apparatus that creates print data comprises intermediate data converting means for converting print data created by an application to an intermediate code format and storing the converted intermediate code format data and the print data processing conditions, editing means for editing the converted intermediate code format data or the print data processing conditions stored by the intermediate data converting means, data creating means for creating print data and processing conditions implementing print processing different from the print processing applied to the print data created by the application based on the data edited by the editing means and preview display controlling means for displaying print processing results beforehand based on the print data created by the data creating means and processing conditions.

In the information processing apparatus according to the present invention, when a plurality of intermediate code format print data is stored, the editing means preferably combines the plurality of intermediate code format print data into a single combined job.

In the information processing apparatus according to the present invention, the preview display controlling means preferably acquires layout information from the stored intermediate code format data and previews the print processing result based on the layout information.

In the information processing apparatus according to the present invention, when a right/left inversion condition is specified in the stored intermediate code format, the preview display controlling means preferably presents a preview in the right/left inverted format based on the editing result from the editing means.

In the information processing apparatus according to the present invention, when color inversion is specified in the stored intermediate code format, the preview display controlling means preferably presents a preview in the color inverted format based on the editing result from the editing means.

In the information processing apparatus according to the present invention, when a plurality of jobs is combined by the editing means, the preview display controlling means preferably presents a preview in a display format in which the combined job is displayed as a single job.

The information processing apparatus according to the present invention preferably comprises print data controlling means for judging whether the print data is created by the application or by the data creating means and controlling the output destination of the print data.

In the information processing apparatus according to the present invention, the print data controlling means preferably releases the occupation of the application after the intermediate data converting means stores the converted data.

In the information processing apparatus according to the present invention, the data in the intermediate code format converted by the intermediate data converting means is preferably data that can be edited in accordance with expansion, contraction, layout display, right/left inversion and color inversion.

In the information processing apparatus according to the present invention, the stored data is identified in the print data combination processing by the editing means based on identification information obtained by adding an ID to identify the stored data to the logical page ID of the stored data.

Furthermore, the information processing method for creating print data comprises an intermediate data converting step of converting print data created by an application to an intermediate code format and storing the converted intermediate code format data and the print data processing conditions, an editing step of editing the converted intermediate code format data or the print data processing conditions stored by the intermediate data converting step, a data creating step of creating print data and processing conditions implementing print processing different from the print processing applied to the print data created by the application based on the data edited by the editing step and a preview display controlling step of displaying print processing results beforehand based on the print data and processing conditions created by the processing in the data creating step.

In the information processing method according to the present invention, when a plurality of intermediate code format print data is stored, the editing step preferably combines the plurality of intermediate code format print data into a single combined job.

In the information processing method according to the present invention, the preview display controlling step preferably acquires layout information from the stored intermediate code format data and previews the print processing result based on the layout information.

In the information processing method according to the present invention, when a right/left inversion condition is specified in the stored intermediate code format, the preview display controlling step preferably presents a preview in the right/left inverted format based on the editing result from the editing step.

In the information processing method according to the present invention, when color inversion is specified in the stored intermediate code format, the preview display controlling step preferably presents a preview in the color inverted format based on the result of editing by the editing step.

In the information processing method according to the present invention, when a plurality of jobs is combined by the editing step, the preview display controlling step preferably presents a preview in a display format in which the combined job is displayed as a single job.

The information processing method according to the present invention preferably comprises a print data controlling step that judges whether the print data is created by the application or by processing in the data creating step and controls the output destination of the print data.

In the information processing method according to the present invention, the print data controlling step preferably releases the occupation of the application after the intermediate data converting step stores the converted data.

In the information processing method according to the present invention, the data in the intermediate code format converted by the intermediate data converting step is data that can be edited in accordance with expansion, contraction, layout display, right/left inversion and color inversion.

In the information processing method according to the present invention, the stored data is identified in the print data combination processing by the editing step based on identification information obtained by adding an ID to identify the stored data to the logical page ID of the stored data.

Furthermore, in a storage medium storing a program module for a computer to execute an information processing method to create print data, the program module comprises an intermediate data conversion module that converts print data created by an application to an intermediate code format and stores the converted intermediate code format data and the print data processing conditions, an editing module that edits the converted intermediate code format data or the print data processing conditions stored by the intermediate data conversion module, a data creation module that creates print data and processing conditions implementing print processing different from the print processing applied to the print data created by the application based on the data edited by the editing module and a preview display control module that displays print processing results beforehand based on the print data and processing conditions created by the processing in the data creation module.

In the storage medium according to the present invention, when a plurality of intermediate code format print data is stored, the editing module preferably combines the plurality of intermediate code format print data into a single combined job.

In the storage medium according to the present invention, the preview display control module preferably acquires layout information from the stored intermediate code format data and performs processing to preview the print processing result based on the layout information.

In the storage medium according to the present invention, when a right/left inversion condition is specified in the stored intermediate code format, the preview display control module preferably presents a preview in the right/left inverted format based on the editing result from the editing module.

In the storage medium according to the present invention, when color inversion is specified in the stored intermediate code format, the preview display control module preferably presents a preview in the color inverted format based on the editing result from the editing module.

In the storage medium according to the present invention, when a plurality of jobs is combined by the editing module, the preview display control module preferably presents a preview in a display format in which the combined job is displayed as a single job.

The storage medium according to the present invention preferably comprises a print data control module that judges whether the print data is created by the application or by the data creation module and controls the output destination of the print data.

In the storage medium according to the present invention, the print data control module preferably releases the occupation of the application after the intermediate data conversion module stores the converted data.

In the storage medium according to the present invention, the data in the intermediate code format converted by the intermediate data conversion module is data that can be edited in accordance with expansion, contraction, layout display, right/left inversion and color inversion.

In the storage medium according to the present invention the stored data is specified in the print data combination processing by the editing module based on identification information obtained by adding an ID to identify the stored data to the logical page ID of the stored data.

In the information processing apparatus that creates print data according to the present invention, comprising: spooling means for storing print data created by an application; determining means for determining whether mirroring or color inversion is specified as the print setting for the print data; preview display controlling means for, when the determining means determines that mirroring or color inversion is specified, creating mirrored or color-inverted display data based on the print data stored in the spooling means and presenting a preview.

In the information processing method that creates print data according to the present invention, comprising: a spooling step for storing print data created by an application; a determining step for determining whether mirroring or color inversion is specified as the print setting for said print data; a preview display controlling step for, when the determining step determines that mirroring or color inversion is specified, creating mirrored or color-inverted display data based on the print data stored in the spooling step and presenting a preview.

In the storage medium that stores a program module for a computer to execute an information processing method for creating print data according to the present invention, the program module comprising: a spooling module for storing print data created by an application; a determining module for determining whether mirroring or color inversion is specified as the print setting for the print data; a preview display controlling module for, when the determining module determines that mirroring or color inversion is specified, creating mirrored or color-inverted display data based on the print data stored in the spooling module and presenting a preview.

In the computer-program which are executed by a computer according to the present invention, comprising: a spooling step for storing print data created by an application; a determining step for determining whether mirroring or color inversion is specified as the print setting for the print data; a preview display controlling step for, when the determining step determines that mirroring or color inversion is specified, creating mirrored or color-inverted display data based on the print data stored in the spooling step and presenting a preview.

Other features and advantages of the present invention will be apparent from the following descriptions taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 10 illustrates an example of a job output setting file that stores information making up a printable physical page created by the spool file manager 304;

FIG. 11 illustrates an example of job setting information;

FIG. 12 illustrates an example of physical page information;

FIG. 33 is a flow chart showing an example of color inversion preview display processing.

DETAILED DESCRIPTION OF THE PREFERRED EMBODIMENTS

Preferred embodiments of the present invention will now be described in detail in accordance with the accompanying drawings.

[First Embodiment]

Figure 1:
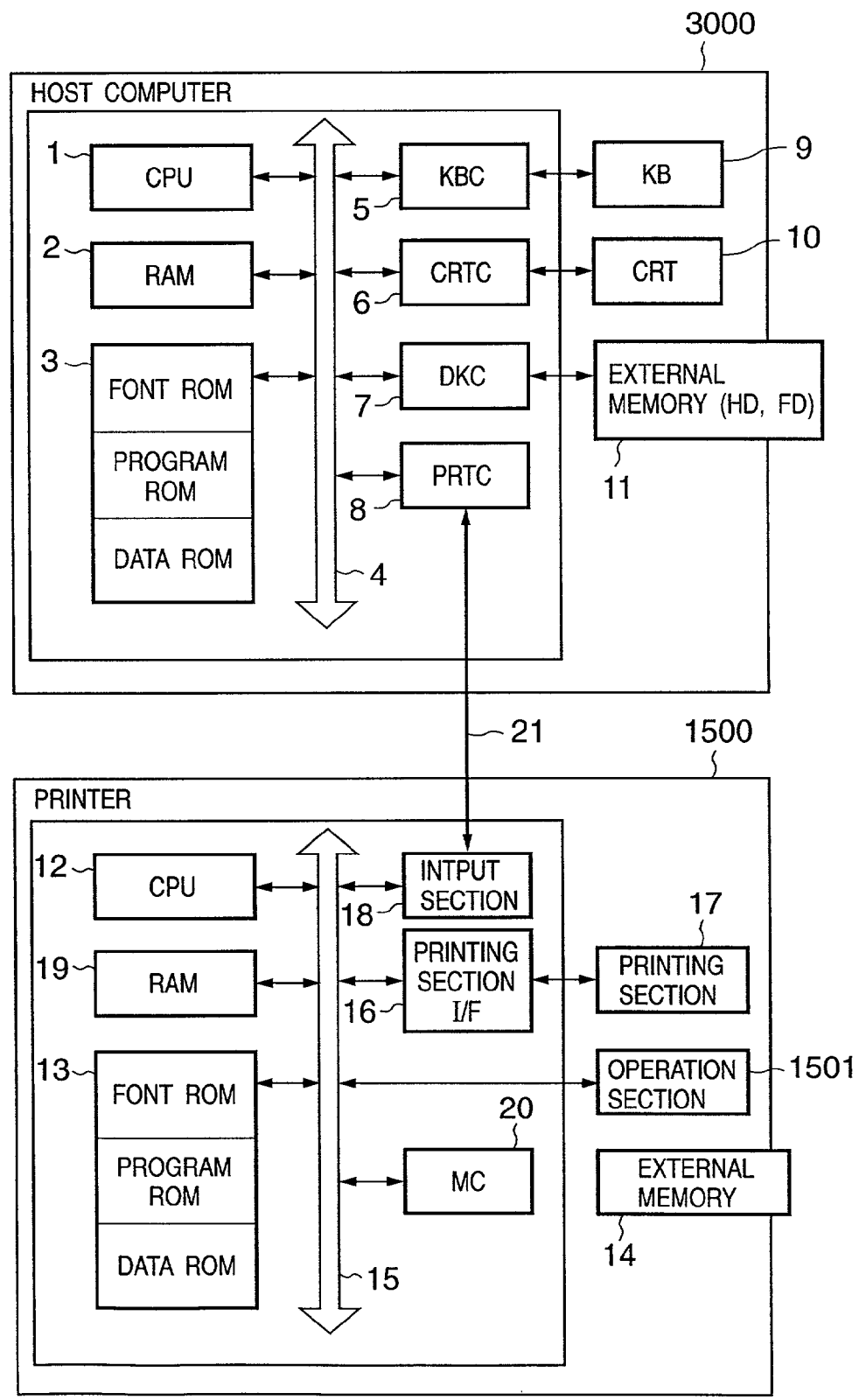
FIG. 1 is a block diagram to explain a configuration of a printing control apparatus showing an embodiment of the present invention.

FIG. 1 is a block diagram to explain a configuration of a printer control system according to this embodiment of the present invention. The present invention is applicable to a system composed of a single device or a plurality of devices or a system that carries out processing via a network such as LAN and WAN as far as the functions of the present invention are executed.

In the same figure, a host computer 3000 is provided with a CPU 1 that executes document processing on a mixture of graphics, images, characters and tables (including spreadsheet, etc.) based on a document processing program stored in a program ROM of ROM 3 or an external memory 11 and the CPU 1 controls devices connected to a system bus 4 in a concentrated manner. Furthermore, this program ROM of the ROM 3 or external memory 11 stores an operating system program (hereinafter referred to as "OS") which is a control program of the CPU 1, etc. and a font ROM of the ROM 3 or external memory 11 stores font data, etc. used for the document processing above and stores various data used to carry out the document processing above, etc. A RAM 2 functions as a main memory or work area, etc. of the CPU 1.

A keyboard controller (KBC) 5 controls a keyboard 9 and key input from a pointing device (not shown). A CRT controller (CRTC) 6 controls the display of a CRT display (CRT) 10. Reference numeral 7 denotes a disk controller (DKC) that controls accesses to/from the external memory 11 such as a hard disk (HD) and floppy disk (FD) that store a boot program, various applications, font data, user file, editing file, printer control command creation program (hereinafter referred to as "printer driver"), etc. A printer controller (PRTC) 8 is connected to a printer 1500 via a bi-directional interface (interface) 21 and executes communication control processing on the printer 1500.

The CPU 1 executes processing, for example, of outline fonts development (rasterization) of display information set in the RAM 2 to the RAM and allows WYSIWYG on the CRT 10. Moreover, the CPU 1 opens various windows registered based on commands indicated by the mouse cursor, etc. (not shown) on the CRT 10 and executes various kinds of data processing. When executing printing, the user can open a window related to a printing setting, set a printer and set a print processing method for the printer driver including the selection of a printing mode.

The printer 1500 is controlled by a CPU 12. The printer CPU 12 outputs an image signal as output information using printer section interface 16 to a printing section (printer engine) 17 connected to a system bus 15 based on a control program, etc. stored in a program ROM of a ROM 13 or a control program, etc. stored in an external memory 14. Furthermore, the program ROM of this ROM 13 stores a control program, etc. of the CPU 12. A font ROM of the ROM 13 stores font data, etc. used to create the output information above and a data ROM of the ROM 13 stores information used on the host computer, etc. in the case of a printer with no external memory 14 such as a hard disk.

The CPU 12 can perform communication with the host computer via an input section 18 and can notify information, etc. in the printer to the host computer 3000. A RAM 19 functions as a main memory and work area, etc. of the CPU 12 and is constructed to be able to expand its memory capacity by an option RAM connected to an expansion port (not shown). The RAM 19 is used as an output information development area, environment data storage area and NVRAM, etc. Accesses to/from the above-described external memory 14 such as the hard disk (HD) and IC card are controlled by a memory controller (MC) 20. The external memory 14 is connected as an option and stores font data, emulation program, form data, etc. Reference numeral 18 denotes the aforementioned operation panel and is provided with operation switches and an LED display, etc.

Moreover, the aforementioned external memory 14 is not limited to a single memory, but can also be constructed to be plural in such a way as to connect an option card in addition to built-in fonts and a plurality of external memories storing a program for interpreting printer control languages of different language systems. Furthermore, the external memory 14 can also be constructed to have an NVRAM (not shown) and store printer mode setting information from the operation panel 1501.

Figure 2:
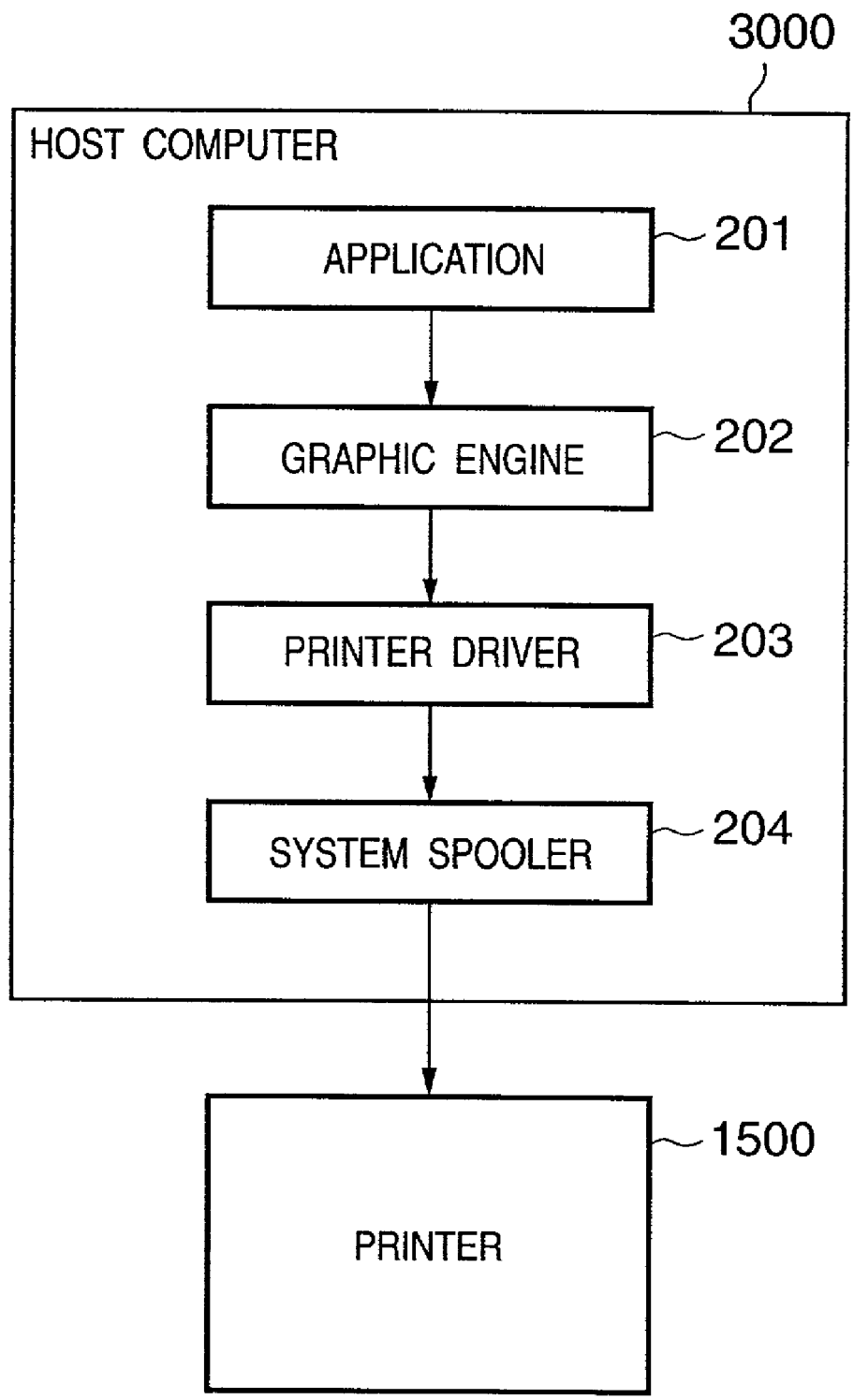
FIG. 2 is a block diagram showing a configuration of a typical print system of a host computer with a printer.

FIG. 2 is a block diagram of typical print processing of a host computer to which a printing device such as a printer is connected directly or via a network. An application 201, graphic engine 202, printer driver 203 and system spooler 204 exist as files stored in the external memory 11, and when executed, these are the program modules loaded to the RAM 2 and executed by the OS or a module that uses the modules.

Furthermore, the application 201 and printer driver 203 can be added to an FD of the external memory 11 or a CD-ROM (not shown) or an HD of the external memory 11 via a network (not shown). The application 201 stored in the external memory 11 is loaded to the RAM2 and executed. When a printout is executed from this application 201 to the printer 1500, data is output (drawn) using the graphic engine 202, which is likewise loaded to the RAM 2 and made executable.

The graphic engine 202 loads the printer driver 203 provided for each printing device from the external memory 11 to the RAM 2 likewise and sets the output of the application 201 in the printer driver 203. Then, the graphic engine 202 converts a GDI (Graphic Device Interface) function received from the application 201 to a DDI (Device Driver Interface) function and outputs the DDI function to the printer driver 203. The printer driver 203 converts the DDI function to a control command recognizable by the printer, for example, PDL (Page Description Language) based on the DDI function received from the graphic engine 202. The converted printer control command is designed to be output to the printer 1500 as print data via the system spooler 204 loaded to the RAM 2 by the OS and via the interface 21.

Figure 3:
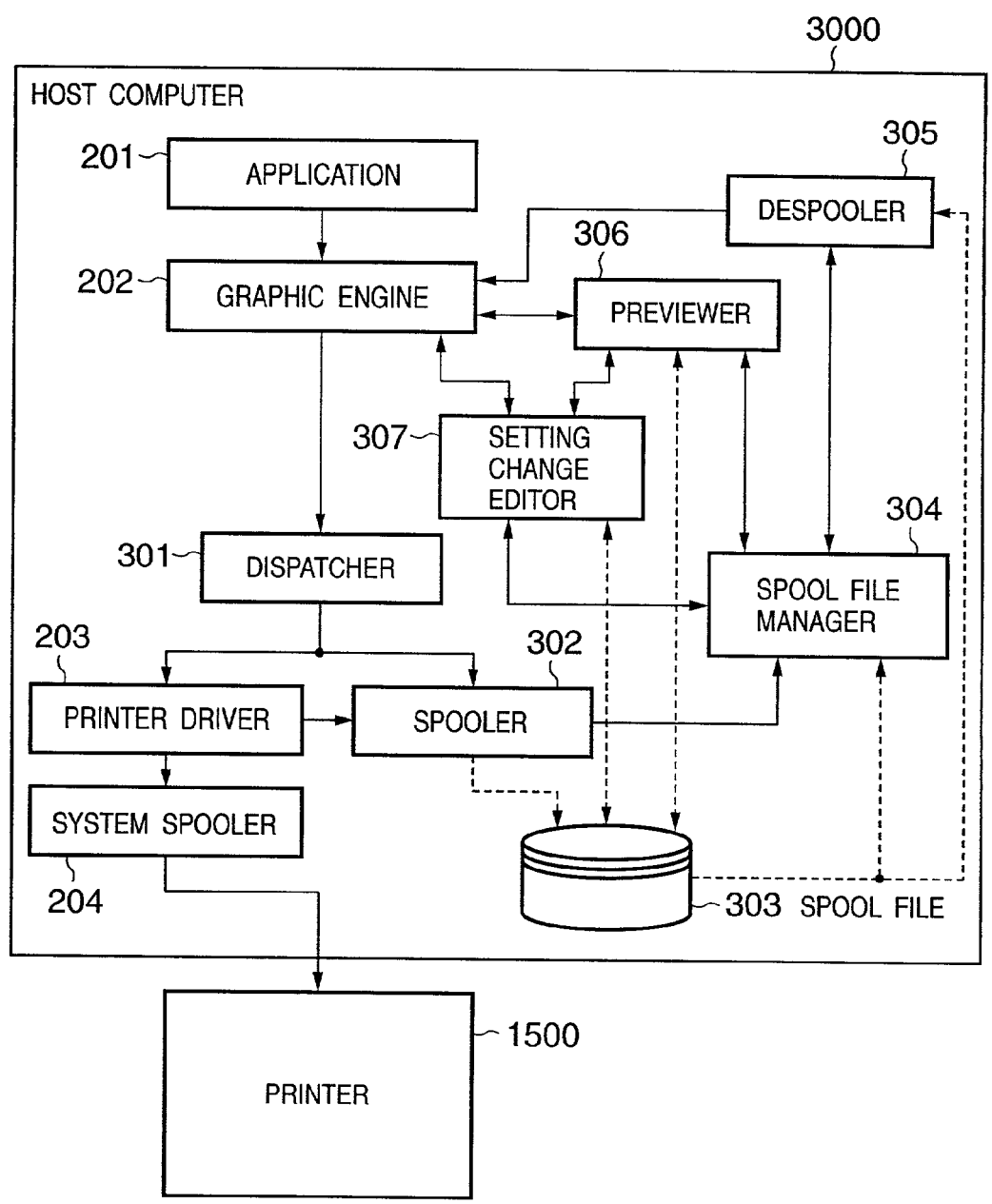
FIG. 3 is a block diagram showing a configuration of a print system that temporarily spools an intermediate code before converting a printing instruction from an application to a printer control command.

The printing system of this embodiment has a configuration of spooling print data from the application temporarily with intermediate code data as shown in FIG. 3 in addition to the printing system constructed of the printer 1500 and host computer 3000 shown in FIG. 2.

FIG. 3 shows a system extended from the system in FIG. 2 and has a configuration whereby a spool file 303 made up of intermediate codes is created temporarily when a print instruction is sent from the graphic engine 202 to the printer driver 203. In the system in FIG. 2, it is when the printer driver 203 has completed the conversion of all printing instructions from the graphic engine 202 to printer control commands that the application 201 is released from the print processing. In contrast, for the system in FIG. 3, it is when the spooler 302 has converted all printing instructions to intermediate code data and output them to the spool file 303 that the application 201 is released from the print processing. Normally, the latter requires less time.

Moreover, in the system shown in FIG. 3, it is possible to process the content of the spool file 303. This makes it possible to implement functions not available from the application, such as printing data from the application in an expanded size or reduced size or by compressing a plurality of pages to a single page, etc.

For these purposes, the system in FIG. 2 has been expanded in such a way as to spool with the intermediate code data as shown in FIG. 3. By the way, in order to process print data, a setting is normally made from the window provided by the printer driver 203 and the printer driver 203 stores the setting content in the RAM 2 or external memory 11.

Details of FIG. 3 will be explained below. As shown in FIG. 3, in this expanded processing system, a dispatcher 301 receives a DDI function, which is a printing instruction from the graphic engine 202. When the printing instruction (DDI function) received by the dispatcher 301 from the graphic engine 202 is based on the printing instruction (GDI function) issued from the application 201 to the graphic engine 202, the dispatcher 301 loads the spooler 302 stored in the external memory 11 to the RAM 2 and sends the printing instruction (DDI function) not to the printer driver 203 but to the spooler 302.

The spooler 302 analyzes the received printing instruction, converts it to intermediate codes page by page and outputs them to the spool file 303. This spool file of intermediate codes stored in page units is called a "Page Description File" (PDF). Moreover, the spooler 302 acquires a processing setting (Nup, double-side, staple, color/monochrome specification, etc.) about the print data set for the printer driver 203 from the printer driver 203 and stores the processing setting in the spool file 303 as a job-unit file. This setting file stored in job-units is called a "job setting file" (abbreviated as "SDF": Spool Description File) This job setting file will be described later.

By the way, the spool file 303 is created as a file in the external memory 11, but can also be created in the RAM 2. Furthermore, the spooler 302 loads a spool file manager 304 stored in the external memory 11 to the RAM 2 and notifies the spool file manager 304 of the creation situation of the spool file 303. Then, the spool file manager 304 decides whether it is possible or not to carry out printing according to the content of the processing setting on the print data stored in the spool file 303.

In the case where the spool file manager 304 decides that it is possible to carry out printing using the graphic engine 202, the spool file manager 304 loads a despooler 305 stored in the external memory 11 to the RAM 2 and instructs the despooler 305 to carry out print processing of the page drawing file with intermediate codes written in the spool file 303.

The despooler 305 processes the page drawing file with intermediate codes contained in the spool file 303 according to the job setting file containing the processing setting information included in the spool file 303, regenerates a GDI function and outputs the GDI function via the graphic engine 202 again.

If the printing instruction (DDI function), which the dispatcher 301 has received from the graphic engine 202, is based on the printing instruction (GDI function) issued from the despooler 305 to the graphic engine 202, the dispatcher 301 sends the printing instruction not to the spooler 302 but to the printer driver 203.

The printer driver 203 generates a printer control command made up of a page description language, etc. based on the DDI function acquired from the graphic engine 202 and outputs the printer control command to the printer 1500 via the system spooler 204.

In addition to the extended system explained so far, FIG. 3 further shows a configuration example that includes a previewer 306 and a setting change editor 307 making it possible to give a preview, change the print setting or combine a plurality of jobs.

Figure 9:
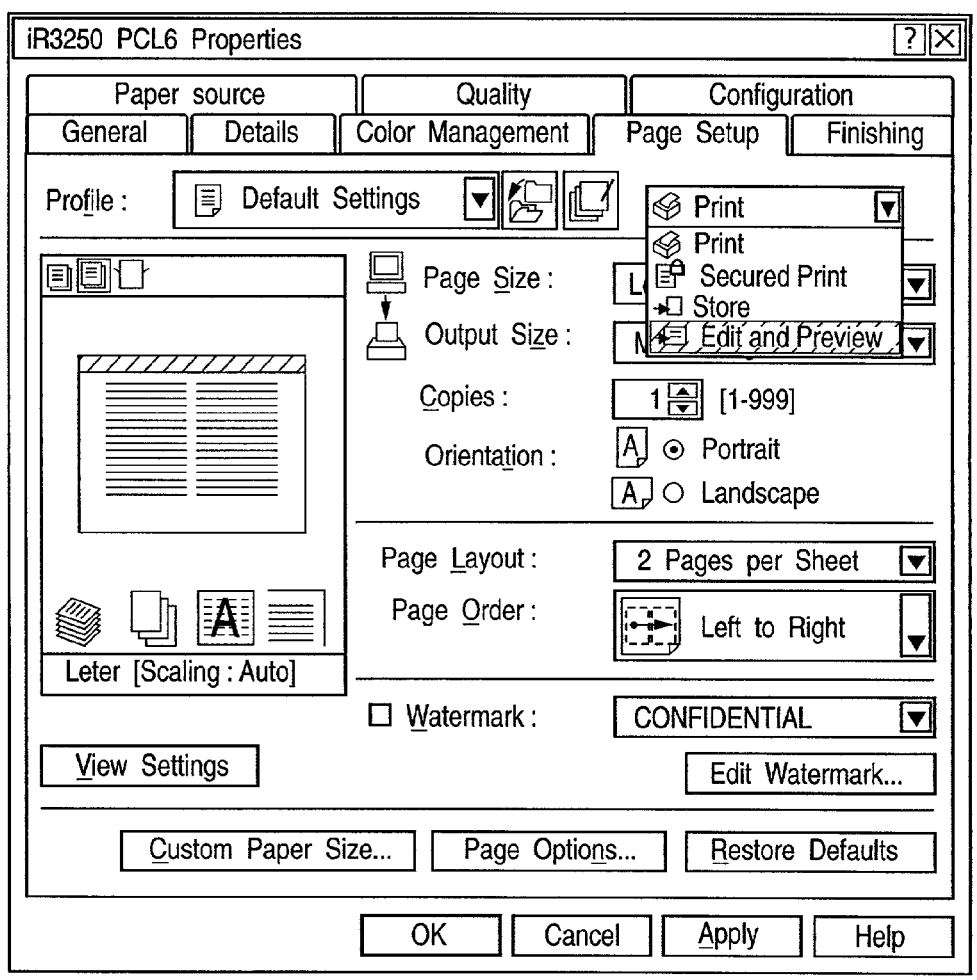
FIG. 9 illustrates an example of a printing spool setting screen.

To give a print preview, change the print setting or combine a plurality of jobs, the user needs to specify "Store" in a pull-down menu, which is the means for "specifying the output destination" in the properties of the printer driver shown in FIG. 9. Moreover, it is desired to see only a preview, "Preview" can be selected as the specification of the output destination.

Thus, the content set by the properties of the printer driver is stored in a structure (called "DEVMODE" in Windows OS) provided as a setting file by the OS. That structure includes, for example, the setting as to whether or not to perform "Store" in the spool file manager 304 during the processing setting included in the spool file 303, and if the spool file manager 304 loads the processing setting via the printer driver and has specified "Store", the page drawing file and job setting file are created and stored in the spool file 303 as described above, the window screen of the spool file manager pops up as shown in FIG. 16 and a list of the jobs spooled in the spool file 303 is shown.

Figure 16:
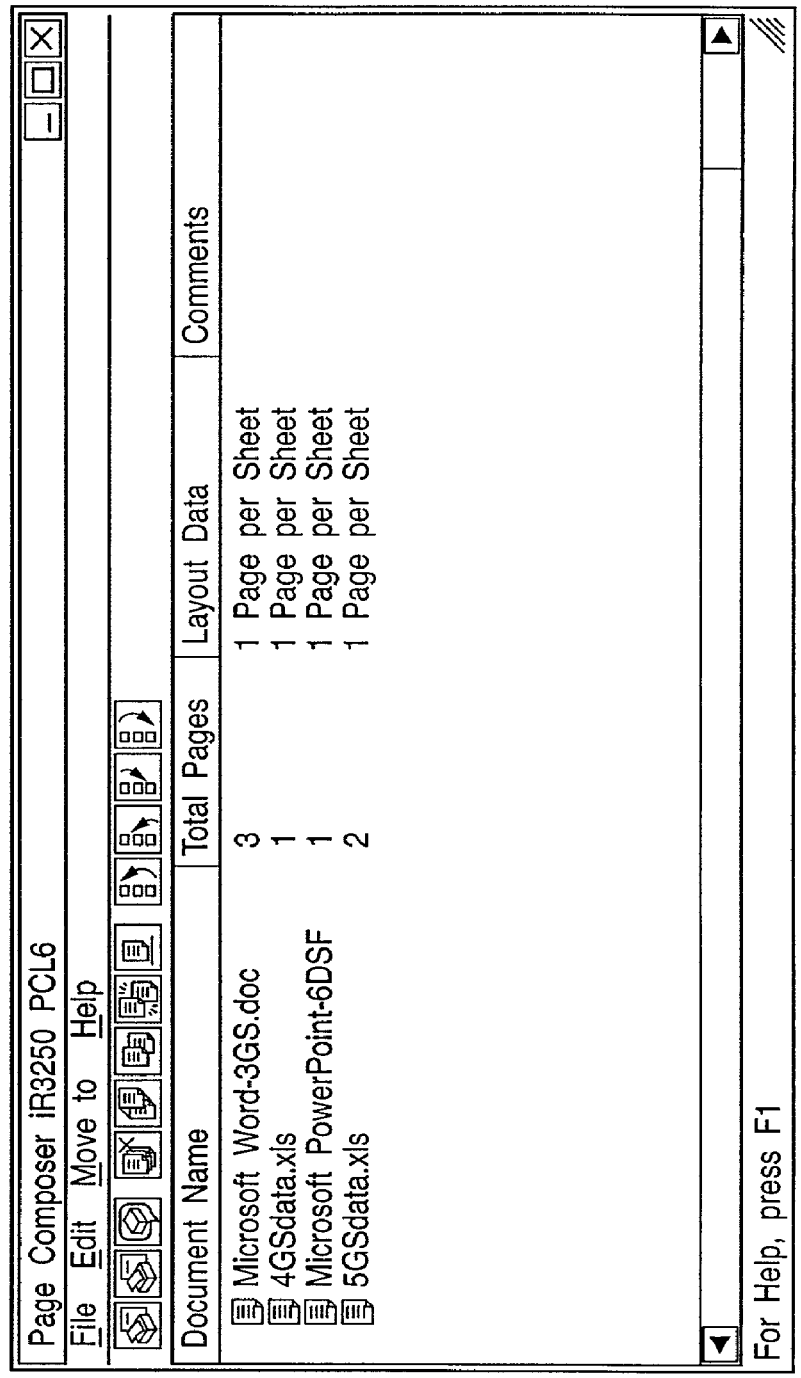
FIG. 16 illustrates an example of a screen displaying a list of printing jobs spooled by the spool file manager 304.

FIG. 16 shows a case where four jobs are spooled and it is possible to operate the jobs by clicking on the menu bar or menu icons just below. The menu bar and menu icons have the same number of operations. There are 11 types of operations; "Print" with a job selected, "Save and print" to print while leaving the spool file with intermediate codes as is, "Preview" to see an output preview of a job taking into account the print setting, "Delete" to delete the spool file with intermediate codes, "Copy" to crate a copy of the spool file with intermediate codes, "Combine" to combine a plurality of jobs of spool files with intermediate codes into a single job, "Divide" to divide the combined job into the original plurality of jobs, "Job edit" to change the print setting of a single job or combined job (layout setting or finishing setting, etc.), "Move to first" to set the printing order of a certain job to the first, "Move one step up" to set the printing order of a certain job one step earlier, "Move one step down" to set the printing order of a certain job one step later or "Move to last" to set the printing order of a certain job to the last.

When a preview of a single job or combined job is specified on the window screen (FIG. 16) of the spool file manager, the previewer 306 stored in the external memory 11 is loaded to the RAM 2 and the previewer 306 is instructed to carry out preview processing on the job with intermediate codes written in the spool file 303.

The previewer 306 reads the page drawing file (PDF) with intermediate codes included in the spool file 303 sequentially, processes according to the content of the processing setting information included in the job setting file (SDF) stored in the spool file 303, and outputs the GDI function to the graphic engine 202, and the graphic engine 202 outputs the drawing data to the own client area, which allows output on the screen.

The graphic engine 202 can perform appropriate rendering according to the specified output destination. This allows the previewer 306 to process the intermediate codes included in the spool file 303 according to the content of the processing setting included in the spool file 303 in the same way as for the despooler 305 and output the processed intermediate codes using the graphic engine 202. Thus, by storing the processing setting set by the printer driver in the spool file 303 as a job setting file and processing and outputting the data of the page drawing file based on this job setting file, it is possible to provide the user with a printing preview, which is close to what will be output by the printer according to how the actual drawing data is printed out or according to various cases where Nup (processing of printing by compressing N logical pages to 1 physical page) is specified, where double-sided printing is specified, where bookbinding printing is specified or where a stamp is specified.

The preview function of conventional application software such as document creation performs drawing only based on the page setting by the application and the print setting by the printer driver is not reflected, which does not allow the user to recognize a preview of what will be actually printed out.

Figure 17:
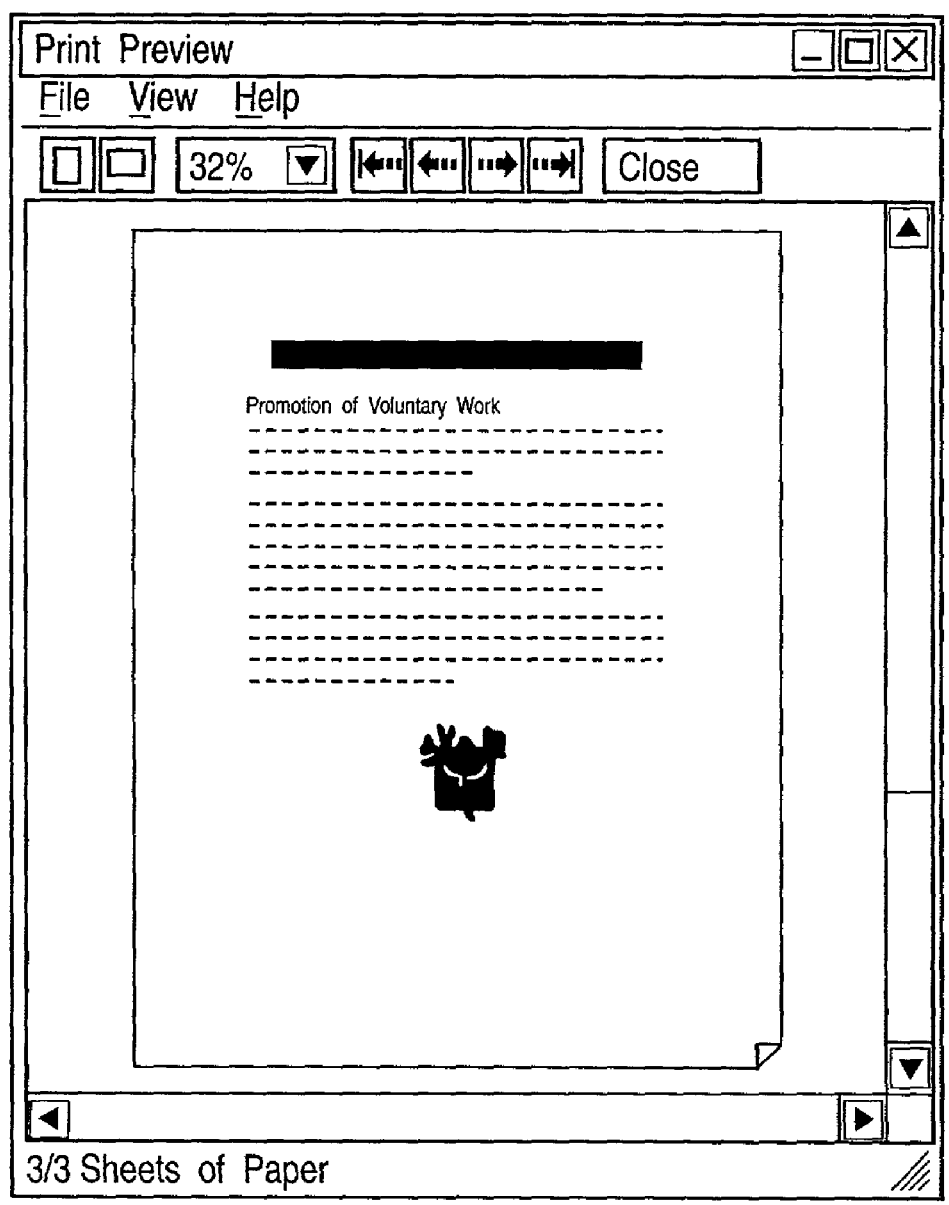
FIG. 17 illustrates an example of a screen of a previewer 306.

Through the preview processing above, the previewer 306 shows a large preview of the print processing setting included in the spool file 303 on the screen as shown in FIG. 17, and then the previewer 306 is closed by a hide instruction from the user and control is shifted to the window screen (FIG. 16) of the spool file manager.

Then, if the user carries out printing according to the content displayed by the previewer 306, the user instructs "Print" or "Save and print" on the spool file manager 304 to issue a print request. As described above, in response to the print request, the despooler 305 processes the page drawing file based on the job setting file to generate a GDI function, sends the GDI function to the graphic engine 202 and a print instruction is sent to the printer driver 203 via the dispatcher 301 and printing is carried out.

Then, a setting change using the setting change editor 307 will be explained.

A setting change is applicable to a job in FIG. 9 for which "Store" is specified in the same way as for a preview. Through a similar flow, the spool file manager 304 pops up and a list of spooled jobs is shown. When "Job Edit" is specified on the window screen (FIG. 16) of the spool file manager and a setting change is instructed, the setting change editor 307 stored in the external memory 11 is loaded to the RAM 2 and the setting change editor 307 is instructed to display the current or default processing setting. Then, a job setting screen shown in FIG. 18 is displayed.

Figure 18:
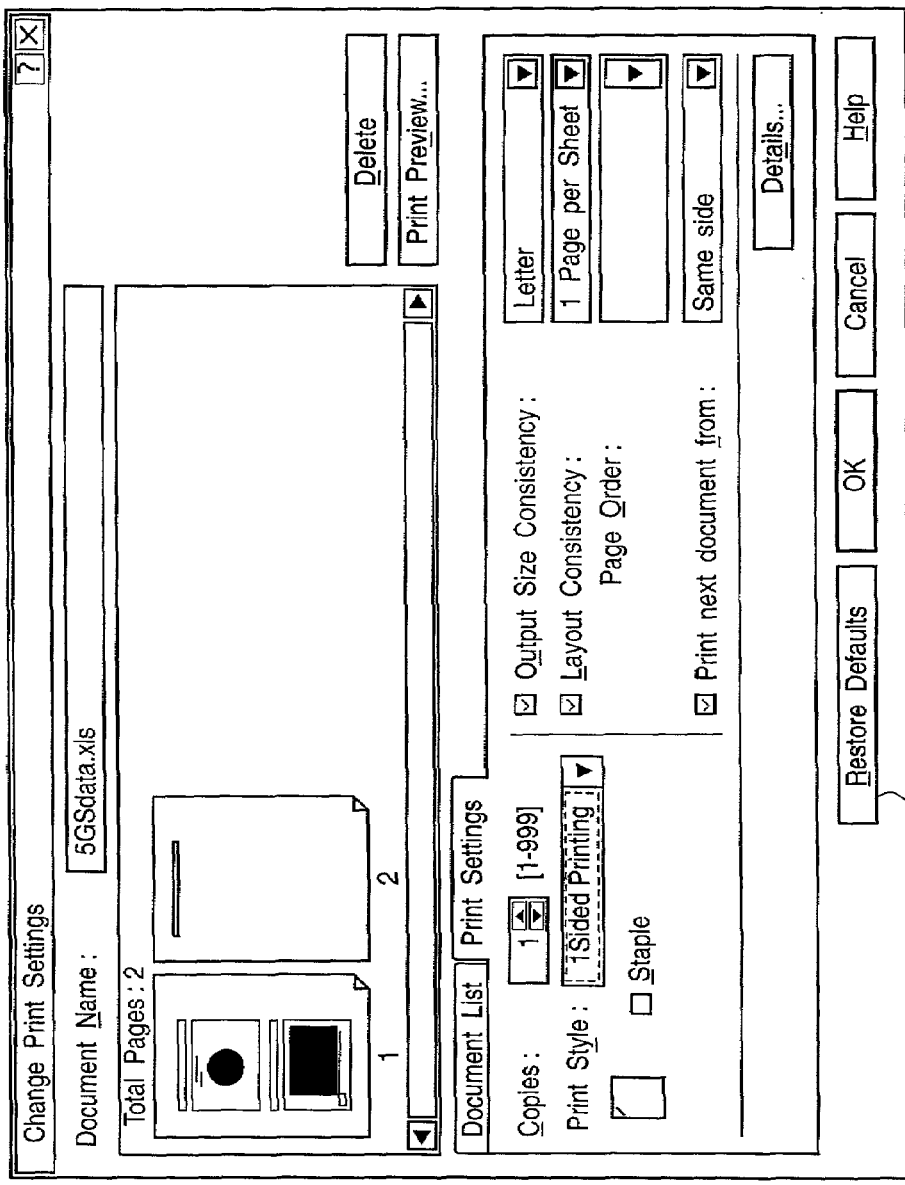
FIG. 18 illustrates an example of a screen of a setting change editor 307.

The setting change editor 307 acquires a job setting file of the job for which "Job Edit" is specified from the spool file 303 and changes the default value of the job setting screen in FIG. 18 based on the setting items specified in the job setting file. The example shown in FIG. 18 specifies in the job setting file of the job specified as "Job and Edit": Copies: 1; Print Style: 1-Sided Printing; Staple: None; Layout: 1 page per sheet, etc.

This setting change editor 307 also processes the page drawing file with intermediate codes included in the spool file 303 according to the content of the processing setting included in the job setting file stored in the spool file 303 and outputs the processed page drawing file to the own client area using the graphic engine 202, thus allowing small preview output on the screen shown in FIG. 18.

Here, it is also possible to change and correct the content of the processing setting included in the job setting file stored in the spool file 303. In this case, it is possible to transmit the settable items of the printer driver 203 to the user interface on the setting change editor 307 or invoke the user interface of the printer driver 203 itself. As shown in FIG. 18, it is possible to specify the number of copies, print style (1-sided, double-sided, bookbinding printing), staple (saddle finisher, etc.), page layout, page order, etc. and reset most of items that can be specified by the printer driver by pressing "Details". However, changes to the settings related to the printing quality such as resolution, graphic mode are not allowed.

The changes made to the items here are authenticated according to an authentication request on the setting change editor 307 and control is shifted to the spool file manager 304. The authenticated changes of the print settings are saved, but these are not saved in the original job setting file. A new job output setting file used for job editing, etc. is created to save the authenticated changes. Details of the job output setting file will be described in and after FIG. 10.

Then, when the user carries out printing according to the content of the setting change as in the case of a confirmation with the previewer 306, the user issues a print request on the spool file manager 304. The print request is transmitted to the graphic engine 202, a print instruction is sent to the printer driver 203 via the dispatcher 301 and printing is carried out.

Moreover, it is possible to combine a plurality of print jobs on the window screen (FIG. 16) of the spool file manager and specify so that the plurality of print jobs is printed as a single print job. As in the case of a preview or a setting change, this also presupposes that the output destination for that job is specified as "Store" in the properties of the printer driver in FIG. 9.

When the user combines print jobs, the user first calls the printer driver 203 from the application 201 and selects "Store" from the user interface shown in FIG. 9. As described above, this selection makes the spool file 303 store the print jobs and the window screen (FIG. 16) of the spool file manager pops up as shown in FIG. 16. A list of the spooled jobs is displayed on the window of the spool file manager. Carrying out a similar operation from the application 201 makes the spool file manager 304 show a list of the plurality of jobs.

Here, if a plurality of jobs is selected and "Combine" is specified, the setting change editor 307 stored in the external memory 11 is loaded to the RAM 2 and the setting change editor 307 is instructed to display the start job in the list or default processing setting. Then, the combination setting screen in FIG. 18 is displayed. Here, the setting change editor 307 is used as the combination setting screen, but it is also possible to use screens of other modules.

This setting change editor 307 processes the page drawing file with intermediate codes included in the spool file 303 according to the content of the processing setting included in the job setting information stored in the spool file 303, outputs the page drawing file to the own client area for all jobs specified as the combined job using the graphic engine 202 and thereby outputs the page drawing file on the screen. In this case, it is possible to present a small preview of all selected jobs in the preview area shown in FIG. 18. Furthermore, when a combined job is generated, a job output setting file is created which extends job setting files of the respective single jobs. This job output setting file is also created to carry out job editing and one file is created for one job and one file is also created for a combined job.

Here, it is possible to display the respective jobs with the processing setting before the combination or change or correct the jobs with a unified processing setting as the combined job and display. In this case, it is possible to transmit the settable items of the printer driver 203 to the user interface on the setting change editor 307 or invoke the user interface of the printer driver 203 itself.

The jobs combined and items changed here are authenticated according to an authentication request on the setting change editor 307 as described above and control is shifted to the spool file manager 304. Through these operations, the previously selected plurality of jobs is displayed as a single combined job on the window of the spool file manager.

Then, if the user carries out printing according to the content of the setting change as in the case of the confirmation by the previewer 306, a print request is issued on the spool file manger 304. The print request is transmitted to the graphic engine 202 and a print instruction is sent to the printer driver 203 via the dispatcher 301 and printing is executed.

Figure 4:
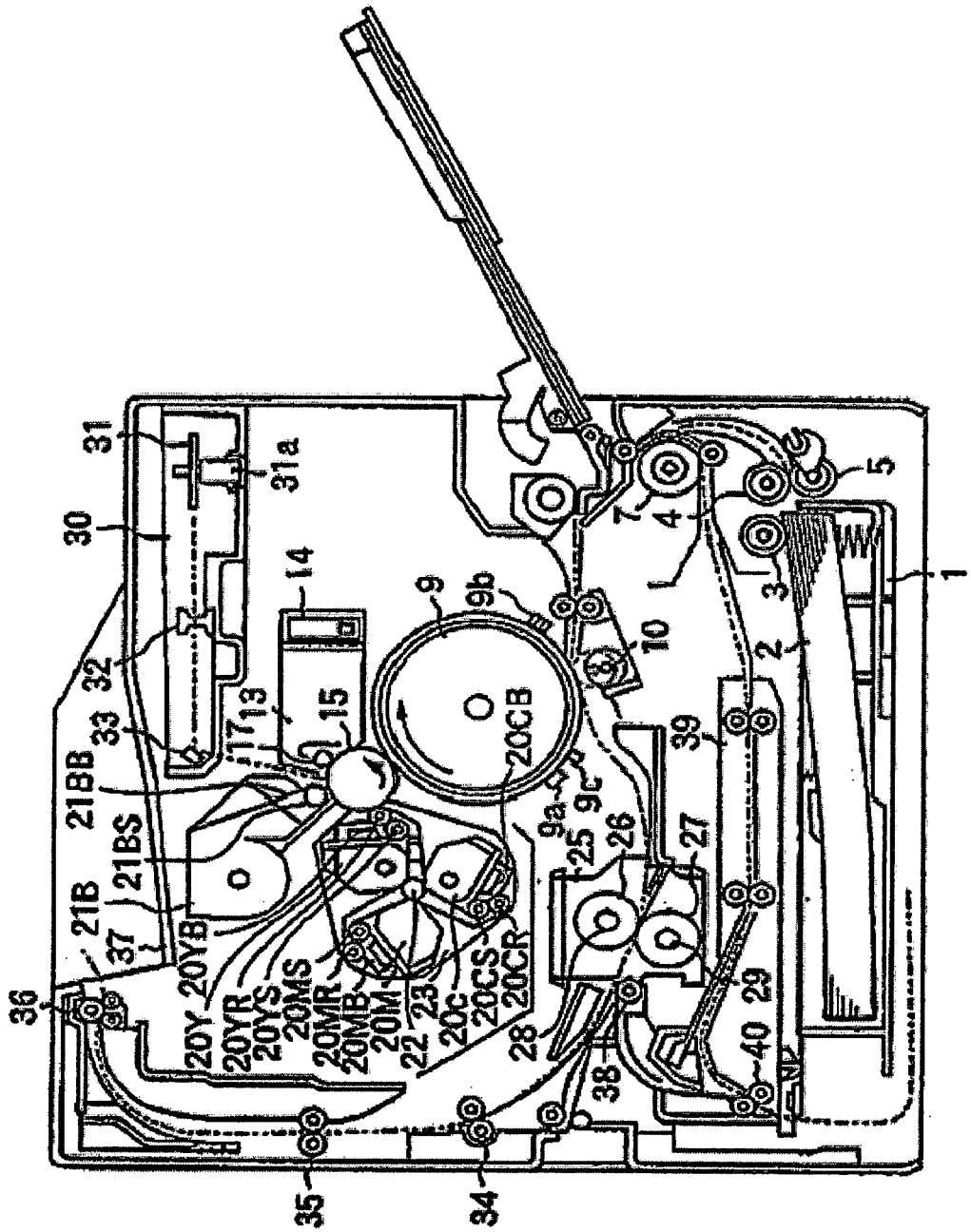
FIG. 4 is a diagram to explain the printer according to the present invention.

FIG. 4 is a cross-sectional view of a color laser printer with a double-sided printing function, which is an example of the printer 1500.

This printer forms an electrostatic latent image by scanning a photosensitive drum 15 through a polygon mirror 31 with a laser beam modulated with image data for each color obtained based on the print data entered from the host computer 3000. Then, this electrostatic latent image is developed with a toner to obtain a visible image and this visible image is multiplexed and transferred to an intermediate transfer unit 9 in all colors to form a color visible image. Then, this color visible image is further transferred to a transfer material 2 and a color visible image is fixed on the transfer material 2. The image formation section that carries out the control above is constructed of a drum unit with a photosensitive drum 15, a primary charge section with a contact charge roller 17, a cleaning section, a development section, an intermediate transfer unit 9, a paper cassette 1, a paper feed section including various rollers 3, 4, 5 and 7, a transfer section including a transfer roller 10 and fixing section 25.

Drum unit 13 is constructed of the photosensitive drum (photoreceptor) 15, a cleaner container 14 with a cleaning mechanism that also serves as a holder of the photosensitive drum 15. This drum unit 13 is supported by the printer in a detachable manner and constructed in a manner easily replaceable as a unit according to the life of the photosensitive drum 15. The photosensitive drum 15 above is constructed by applying an organic photoconductive layer to the outer regions of an aluminum cylinder and supported in a pivotable manner by the cleaner container 14. The photosensitive drum 15 is rotated by a drive force transmitted from a drive motor, which is not shown, and the drive motor rotates the photosensitive drum 15 counterclockwise according to the operation of image formation. An electrostatic latent image is formed by selectively exposing the surface of the photosensitive drum 15. In a scanner section 30, the polygon mirror rotated by a motor 31a in synchronization with a horizontal sync signal of an image signal reflects the modulated laser beam and irradiates the photosensitive drum via a lens 32 and a reflector 33.

The development section is constructed of three color developing units 20Y, 20M and 20C that develop yellow (Y), magenta (M) and cyan (C), a black developing unit 21B that develops black (B). The color developing units 20Y, 20M and 20C and black developing unit 21B are each provided with sleeves 20YS, 20MS, 20 CS and 21BS, and application blades 20YB, 20MB, 20 CB and 21BB that are pressed against the respective outer regions of these sleeves 20YS, 20MS, 20 CS and 21BS. The three color developing units 20Y, 20M and 20C are provided with application rollers 20YR, 20MR and 20CR.

Moreover, the black developing unit 21B is attached to the printer in a detachable manner and the color developing units 20Y, 20M and 20C are attached to a developing rotary 23 that rotates around a rotation axis 22 in a detachable manner.

The sleeve 21BS of the black developing unit 21B is placed at a micro distance of the order of 300 μm, for example, from the photosensitive drum 15. The black developing unit 21B carries a toner using a feeding section built in the printer and adds charge to the toner by means of friction charging in such a way that application blade 21BB adds charge to the outer regions of the sleeve 21BS that rotates clockwise. Furthermore, by applying a developing bias to the sleeve 21BS, a development is made to the photosensitive drum 15 according to the electrostatic latent image to form a visible image with the black toner on the photosensitive drum 15.

The three color developing units 20Y, 20M and 20C rotate together with the rotation of the developing rotary 23 to form an image and the predetermined sleeves 20YS, 20MS and 20CS face the photosensitive drum 15 at a micro distance of the order of 300 μm. This makes the predetermined color developing units 20Y, 20M and 20C stop at the facing developing positions to form a visible image on the photosensitive drum 15.

At the time of formation of a color image, the developing rotary 23 rotates every time the intermediate transfer unit 9 makes one revolution to perform developing processes in order of the yellow developing unit 20Y, magenta developing unit 20M, cyan developing unit 20C and black developing unit 21B. The intermediate transfer unit 9 makes four revolutions to form visible images using the respective toners of yellow, magenta, cyan and black one by one and as a result, forms a full-color visible image on the intermediate transfer unit 9.

The intermediate transfer unit 9 is constructed to contact the photosensitive drum 15 and rotate together with the rotation of the photosensitive drum 15, and at the time of formation of a color image, rotates clockwise and receives four multiplexed transfers of visible images from the photosensitive drum 15. Moreover, the intermediate transfer unit 9 carries out multiplexed transfers of the color visible image on the intermediate transfer unit 9 simultaneously onto the transfer material 2 by contacting a transfer roller 10 which will be described later at the time of formation of an image and carrying the transfer material 2 by holding it together with the transfer roller 10. The outer region of the intermediate transfer unit is provided with a top sensor 9a to detect the position of the intermediate transfer unit 9 in the rotation direction, RS sensor 9b and a density sensor 9c to detect the density of the toner image transferred onto the intermediate transfer unit.

The transfer roller 10 is provided with a transfer charger supported against the photosensitive drum 15 in detachable manner and constructed of a metallic axis wound with a medium resistance foaming elastic body.

While a color visible image is being multiplexed and transferred onto the intermediate transfer unit 9 as shown with solid line in FIG. 4, the transfer roller 10 is separated below so as not to disturb the color visible image. Then, after a 4-color visible image is formed on the intermediate transfer unit 9, the transfer roller 10 is raised to the position indicated by dotted line in the figure by a cum section (not shown) at the timing of transferring this color visible image to the transfer material 2. This makes the transfer roller 10 contact the intermediate transfer unit 9 via the transfer material 2 at a predetermined pressure, a bias voltage is applied and the color visible image on the intermediate transfer unit 9 is transferred to the transfer material 2.

The fixing section 25 is intended to fix the transferred color visible image while carrying the transfer material 2 and is provided with a fixing roller 26 to heat the transfer material 2 and a pressurizing roller 27 to press the transfer material 2 against the fixing roller 26. The fixing roller 26 and pressurizing roller 27 have a hollowed structure and contain built-in heaters 28 and 29, respectively. That is, transfer material 2 that retains the color visible image is carried by the fixing roller 26 and pressurizing roller 27 and at the same time the toner is fixed on the surface of transfer material 2 by adding heat and pressure.

After fixing of the visible image, the transfer material 2 is ejected to a sheet ejection section 37 through sheet ejection rollers 34, 35 and 36 and the image formation operation is completed.

The cleaning means is intended to clean the toner remaining on the photosensitive drum 15 and the intermediate transfer unit 9 and the waste toner after transferring the visible image with the toner formed on the photosensitive drum 15 to the intermediate transfer unit 9 or the waste toner after transferring the 4-color visible image formed on the intermediate transfer unit 9 to the transfer material 2 are stored in a cleaner container 14.

The transfer material 2 (recording sheet) to be printed is picked up from a paper feed tray 1 by a paper feed roller 3, carried forward between the intermediate transfer unit 9 and the transfer roller 10, with a color toner image recorded on it, passed through the fixing section 25 where the toner image is fixed. In the case of one-sided printing, a guide 38 forms a transfer path in such a way as to guide the recording sheet to the paper ejection section in the upper section. In the case of double-sided printing, the guide 38 forms a transfer path in such a way as to guide the recording sheet to a double-sided unit below.

The recording paper guided to the double-sided unit is sent to a lower section of the tray 1 (transfer path indicated by two-dot dashed line) and then carried backward by a carrying roller 40 and sent to a double-sided tray 39. On the double-sided tray 39, the sheet is turned around from the state in which it is placed on the paper feed tray 1 and the transfer direction is reversed. Carrying out a transfer and fixing of the toner image in this state again allows double-sided printing.

Figure 5:
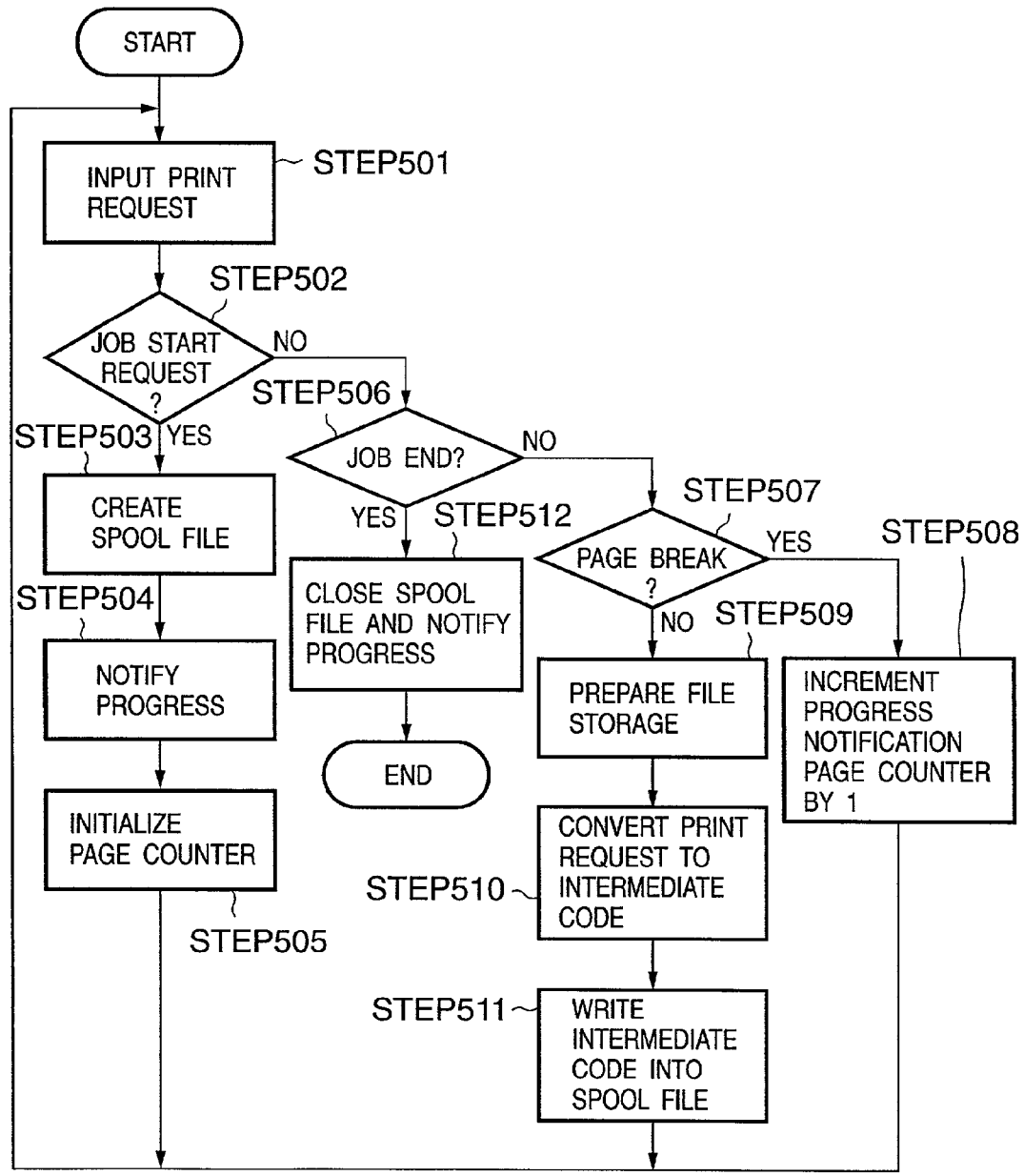
FIG. 5 is a flow chart showing processing in spooler 302.

FIG. 5 is a flow chart of the processing of page-unit saving steps in creating the spool file 303 by the spooler 302.

Figure 8:
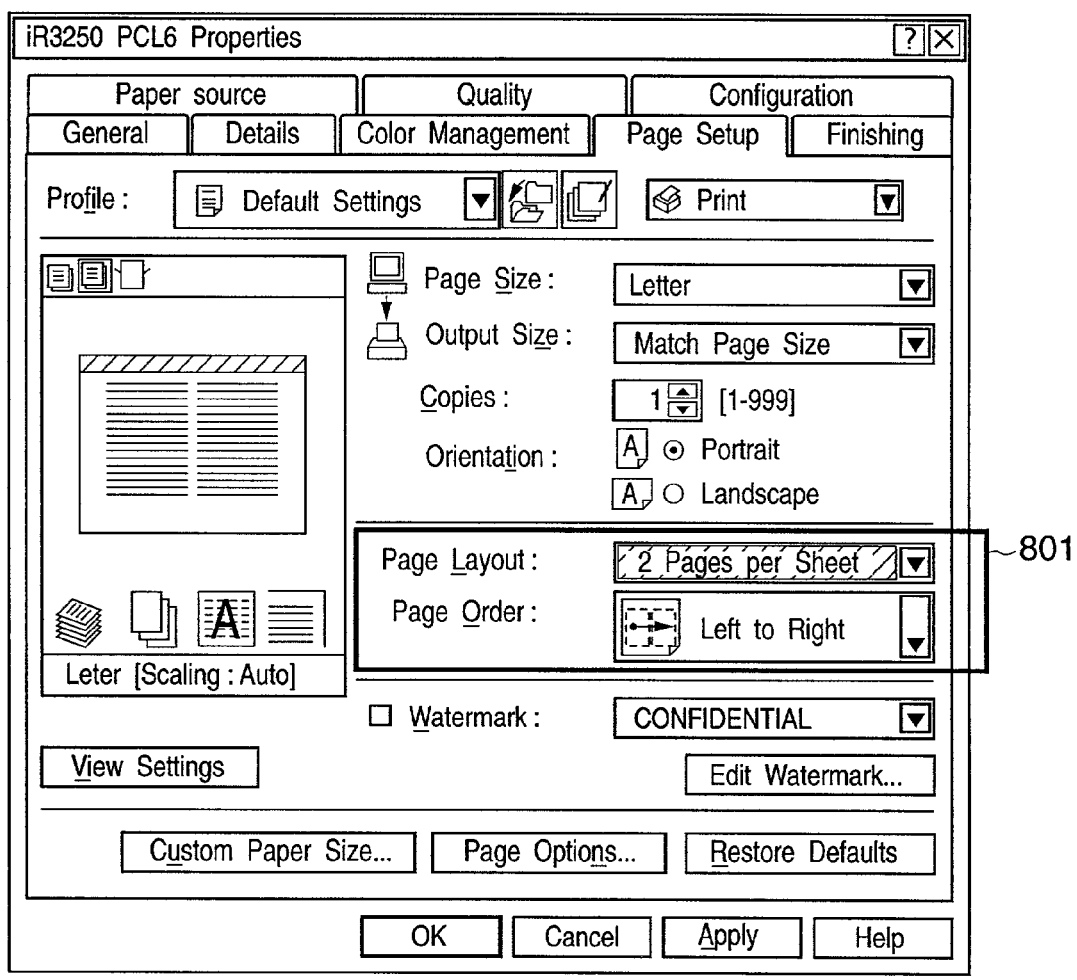
FIG. 8 illustrates an example of a print setting screen.

First, in step 501, the spooler 302 receives a print request from the application via the graphic engine 202. The application displays a dialog box to enter the print setting as shown in FIG. 8 and the print setting entered from this dialog box is passed from the printer driver to the spooler 303. The setting input dialog box shown in FIG. 8 includes setting items, etc. to determine the number of logical pages to layout on 1 physical page as shown in 801.

In step 502, the spooler 302 judges whether the received print request is a job start request or not and if it is judged to be the job start request in step 502, the process moves on to step 503 and the spooler 302 creates a spool file 303 to temporarily save intermediate data.

Then, in step 504, the spooler 302 notifies the spool file manager 304 of the progress of print processing and in next step 505, initializes the page counter of the spooler 302 to 1. Here, the spool file manager 304 loads and stores the information and processing setting, etc. of the job for which printing is started from the spool file 303.

On the other hand, if the request is judged not to be the job start request in step 502, the process moves on to step 506.

In step 506, the spooler 302 judges whether the received request is a job end request or not. If the request is judged not to be a job end request, the process moves on to step 507 and judges whether or not to create a page break. If it is judged in step 507 that a page break should be created, the process moves on to step 508 and notifies the spool file manager 304 of the progress of the print processing. Then, the page count is incremented, a page drawing file that stores intermediate codes is closed and the next page drawing file is created.

In step 507, if the received print request is judged not to be for creating a page break, the process moves on to step 509 and the spooler 302 prepares for writing intermediate codes to the page drawing file.

Then, in step 510, in order to store the print request in the spool file 303, the spooler 302 carries out processing of converting the DDI function of the print request to intermediate codes. In step 511, the spooler 302 writes the print request (intermediate codes) converted to a storable form in step 510 to the page drawing file of the spool file 303. Then, the spooler goes back to step 501 and accepts a print request from the application again. The spooler 302 continues this series of processing from step 501 to step 511 until it receives a job end request (End Doc) from the application.

Furthermore, the spooler 302 acquires information such as the processing setting stored in the DEVMODE structure from the printer driver 203 and stores it in the spool file 303 as the job setting file.

On the other hand, in step 506, if the print request from the application is judged to be a job end, all print requests from the application are completed, and therefore the spooler 302 moves on to step 512, notifies the spool file manager 304 of the progress of the print processing and ends the processing.

Figure 6:
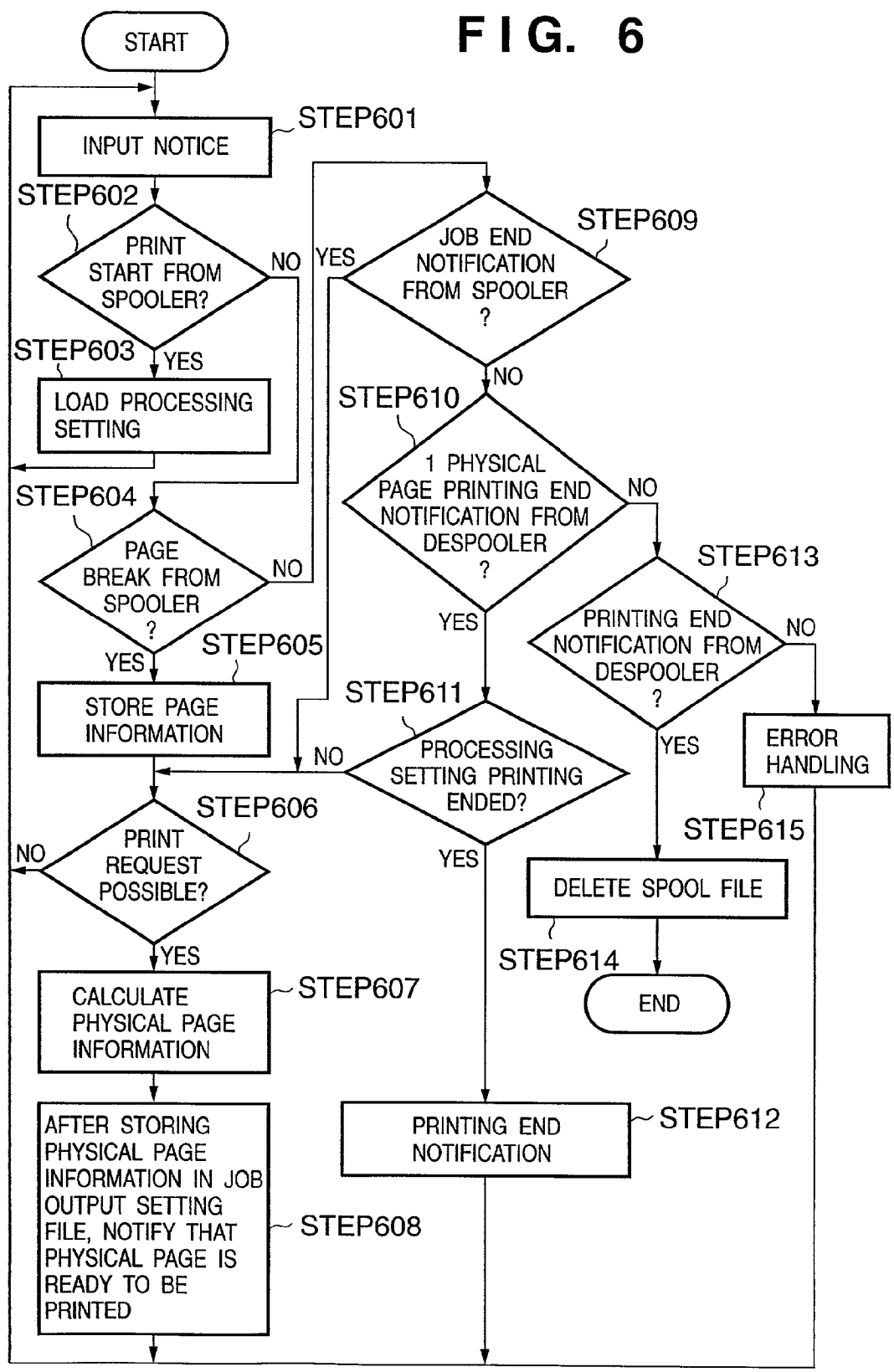
FIG. 6 is a flowchart showing printing control in spool file manager 304.

FIG. 6 shows details of control in a flow chart between the spool file 303 creation process and the print data creation process in the spool file manager 304.

In step 601, the spool file manager 304 receives a notice of the progress of the print processing from the spooler 302 or despooler 305.

In step 602, the spool file manager 304 judges whether the progress notice is the print start notice from the spooler 302 notified in aforementioned step 504 or not and if so, the spool file manager 304 moves on to step 603, loads the print processing setting from the spool file 303 and starts to control the job.

On the other hand, in step 602, if the progress notice is not the print start notice from the spooler 302, the spool file manager 304 moves on to step 604, the spool file manager 304 judges whether the progress notice is print end notice of 1 logical page from the spooler 302 notified in aforementioned step 508 or not. Here, if the progress notice is the print end notice of 1 logical page, the spool file manager 304 moves on to step 605 and stores logical page information corresponding to this logical page.

Then, in next step 606, the spool file manager 304 judges whether it is possible to start printing of one physical page for n logical pages for which spooling is finished at this point in time or not. If it is possible to start printing here, the spool file manager 304 moves on to step 607 and determines the physical page number from the logical number assigned to one physical page. If it is not possible to start printing of one physical page, the file manager returns to aforementioned step 601.

Regarding the calculation of a physical page, if, for example, the processing setting is a setting whereby four logical pages are placed on one physical page, the first physical page can be printed when the fourth logical page is spooled and becomes the first physical page. Then, the second physical page can be printed when the 8th logical page is spooled.

Moreover, even if the total number of logical pages is not a multiple of the number of logical pages to be placed on one physical page, it is possible to decide the logical page to be placed on one physical page through a spool end notice in step 512.

Then, in step 608, the logical page number and information such as the physical page number that make up the physical page which has been made printable are saved in a job output setting file (file including physical page information) in a format shown in FIG. 10 and that the physical page information has been added for one physical page is notified to the despooler 305. Then, the process goes back to step 601 and waits for the next notice. In this embodiment, print processing is available even if all spooling of a print job is not completed when one page of print data, that is, a logical page making up one physical page is spooled.

On the other hand, in step 604, if the progress notice is not a print end notice of one logical page from the spooler 302, the process moves on to step 609 and the spool file manager 304 judges whether it is the job end notice from the spooler 302 notified in aforementioned step 512 or not. Here, if it is the job end notice, the process moves on to aforementioned step 606. On the other hand, if it is not the job end notice, the process moves on to step 610 and the spool file manager 304 judges whether the received notice is the print end notice of one physical page from the despooler 305 or not.

Here, if it is the print end notice of one physical page, the process moves on to step 611 and judges whether all printing of the processing setting has ended or not. If the printing is completed, the process moves on to step 612 and notifies the despooler 305 of the end of printing.

On the other hand, if it is judged that the printing for the processing setting is not completed yet, processing advances to aforementioned step 606. The despooler 305 in this embodiment assumes one physical page as a unit for carrying out print processing. Furthermore, in step 608, information necessary for carrying out print processing of one physical page is successively saved in a file in a reusable form, but when it is not possible to reuse, it is also possible to use a high-speed medium such as a common memory and overwrite one after another in 1 physical page units to increase the speed and save resources.

Furthermore, when the progress of spooling is ahead of the progress of despooling or when despooling starts after spooling of all pages is completed, instead of notifying that page printing is possible in 1 physical page units in step 608, it is possible to reduce the number of times of notification for the notification content that printing of a plurality of physical pages or all physical pages is made possible according to the progress of the despooling side.

In step 610, if it is judged that the notice is not the print end notice of one physical page from the despooler 305, the process moves on to step 613, the spool file manager 304 judges whether it is the print end notice from the despooler 305 or not. If the notice is judged to be the print end notice from the despooler 305, the process moves on to step 614 and the spool file manager 304 deletes the corresponding page drawing file of the spool file 303 and ends the processing. On the other hand, if it is not the print end notice from the despooler 305, the process moves on to step 615, carries out other normal processing and waits for the next notice.

Figure 7:
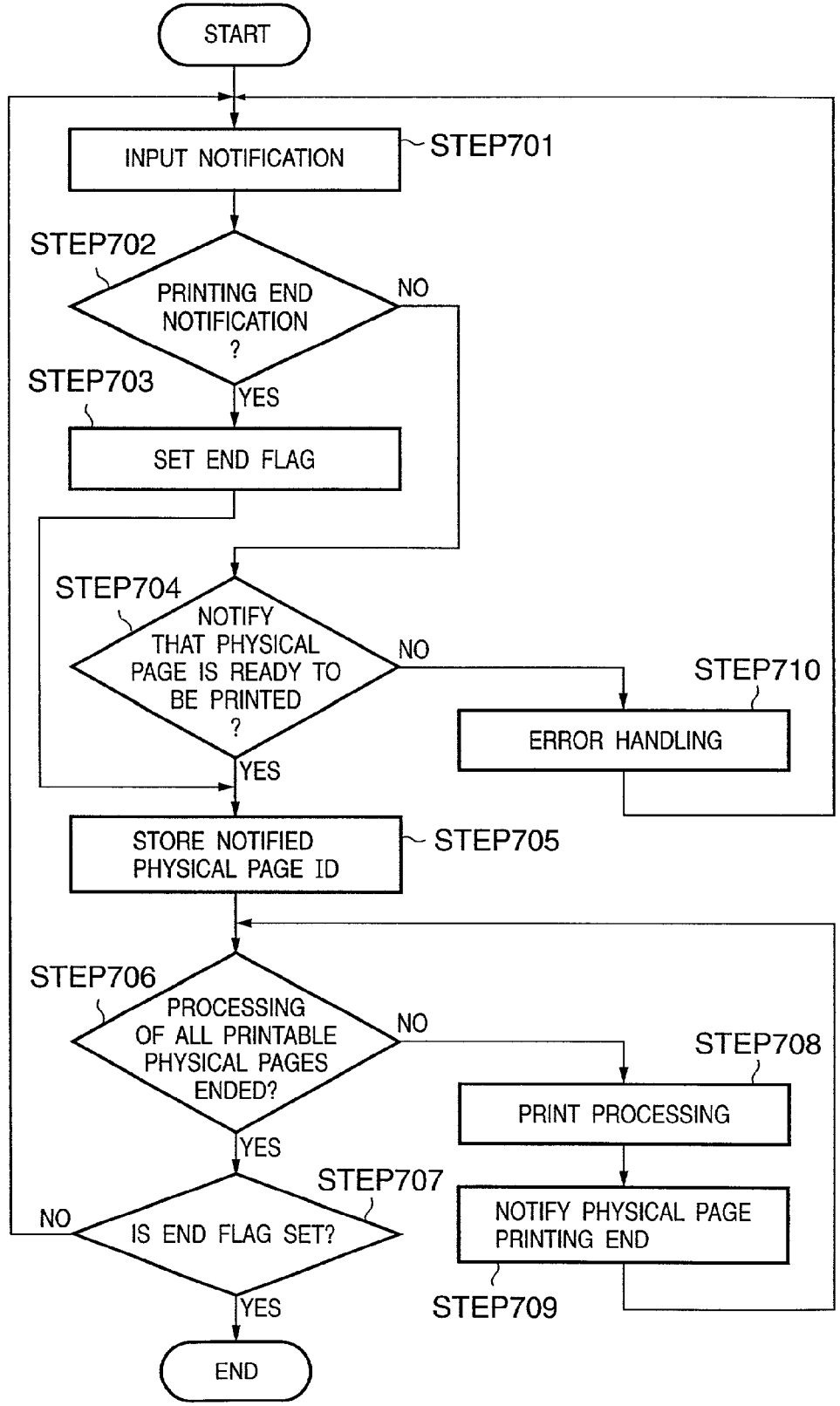
FIG. 7 is a flow chart showing processing in despooler 305.

FIG. 7 is a flow chart of details of the print data creation process by the despooler 305.

The despooler 305 loads necessary information (page drawing file and job setting file) from the spool file 303 and creates print data according to the print request from the spool file manager 304. The method of transferring the print data created to the printer is the same as explained in FIG. 3.

When print data is created, the notice from the aforementioned spool file manger 304 is input in step 701 first. In next step 702, the despooler 305 judges whether the notice entered is a job end notice or not and if it is the job end notice, the process moves on to step 703, sets an end flag and moves on to step 705.

On the other hand, if it is not the job end notice in step 702, the process moves on to step 704 and it is judged whether the print start request of one physical page in aforementioned step 608 has been notified or not. If it is judged not to be the start request in step 704, the process moves on to step 710, carries out other error handling, goes back to step 701 and waits for the next notice.

On the other hand, if it is judged as the print start request for one physical page in step 704, the process moves on to step 705 and the despooler 305 saves the ID of the physical page which is notified in step 704 and which can be subjected to print processing. In next step 706, the despooler 305 judges whether print processing has been completed for all pages with the physical page IDs saved in step 705.

Here, if processing of all physical pages is completed, the process moves on to step 707 and judges whether an end flag is set in aforementioned step 703 or not. If the end flag is set, it is regarded that printing of the job is completed and the notice that processing by the despooler 305 has ended is given to the spool file manger 304 and the processing ends. If it is judged in step 707 that the end flag is not set, the process goes back to step 701 and waits for the next notice.

On the other hand, if it is judged in step 706 that there still remain physical pages that can be printed, the process moves on to step 708 and the despooler 305 loads unprocessed physical page IDs one by one from the saved physical IDs, loads information necessary to create print data of the physical pages corresponding to the loaded physical page IDs and carries out print processing. In the print processing, a print request instruction stored in the spool file 303 is converted by the despooler 305 to a format (GDI function) recognizable by the graphic engine 202 and transferred. In the case of the processing setting (hereinafter N-page printing) in which a plurality of logical pages is laid out on one physical page as in the case of this embodiment, conversion is performed by taking into account the compression layout in this step. When necessary print processing is completed, in next step 709, the notice of the end of print data creation of one physical page is given to the spool file manager 304. Then, the process goes back to step 706, the procedure up to print processing for all printable physical page IDs that have been saved in step 705 is repeated.

This is the flow of print processing using the dispatcher 301, spooler 302, spool file manager 304 and despooler 305. By carrying out processing as described above, the application 201 is released from the print processing at the timing at which the spooler 302 creates intermediate codes and stores in the spool file 303, and this requires less time than directly outputting to the printer driver 203. Moreover, since the spool file 303 temporarily stores an intermediate file (page drawing file, job setting file) that reflects the print setting of the printer driver, it is possible to allow the user to recognize the print preview of what is actually printed or combine or rearrange print jobs created by a plurality of applications. When the print setting is changed, this also allows the user to change the print setting without restarting the application to print.

Here, in the print processing using the spooler 302, a job output setting file is created when the despooler 305 requests the graphic engine 202 for printing, but a job output setting file is also created when a preview or job combination, etc. is performed. The job output setting file is equivalent to the job setting file in the case of a single job and is created based on a plurality of job setting information pieces in the case of a combined job. Here, the job output setting file will be explained.

FIG. 10 shows an example of the job output setting file that stores information that constitutes a printable physical page created by the spool file manager 304.

Field 1001 is an ID to identify a job and can also store the ID in a form of the file name and the name of the common memory that store this information. Field 1002 is job setting information. The job setting information includes information that is the only choice to be set for each job such as a structure necessary for the graphic engine 202 to start printing of a job, specification of N-page printing, specification of additional drawing such as a page frame, number of copies, finishing specification such as staple.

The job setting information 1002 stores all necessary information according to the function that corresponds to the job.

Field 1003 shows the number of physical pages of a job and indicates that physical page information corresponding to this number of physical pages is stored from this field on.

Since this embodiment adopts a system of notifying the number of printable physical pages, operation is possible without this field. Physical page information corresponding to the number of physical pages described in field 1003 is stored from this field on from field 1004 to the last field. The physical page information will be explained in FIG. 12.

FIG. 11 is an example of the job setting information illustrated in field 1002 in FIG. 10. Field 1101 is the total number of physical pages. Field 1102 is the total number of logical pages.

Fields 1101 and 1102 are added to the print data and used in such a case where the number of pages is printed as additional information. While printing is in progress, both fields show provisional values or the spool file manager 304 postpones the creation of information on printable physical pages until printing is completed.

Field 1103 is copy number information that specifies the number of copies of this print job to be printed. Field 1104 specifies whether printing is performed in a set number of copies when more than one copy is set as the number of copies in Field 1103. Field 1105 is finishing information such as staple, punch, Z-folding and is specified when a finisher is incorporated in the printer or externally provided. Field 1106 is additional printing information and stores additional information such as decoration like a page frame and date, user name, number of pages, watermark printing, that is, information to be added to a job. As the number of functions increases, the number of fields included in this job setting information also increases. For example, if double-sided printing is available, a field to store the specification of double-sided printing is added.

FIG. 12 shows an example of physical page information illustrated by field 1004 in FIG. 10. The first field 1201 is a physical page number and is a value used to control the printing order and additionally print the physical page number. Field 1202 is physical page setting information, and when layout or color/monochrome can be specified for each physical page, stores the layout or color/monochrome settings. Field 1203 is the number of logical pages assigned to this physical page and when four pages are assigned to one physical page, stores an ID indicating 4 or printing of 4 pages. Field 1204 and thereafter store information of logical pages corresponding to the number specified in Field 1203. Depending on the number of pages printed from the application 201, the actual number of page data may be smaller than the number of pages specified in 1203. In that case, special data indicating blank pages is saved in the logical page information.

Figure 13:
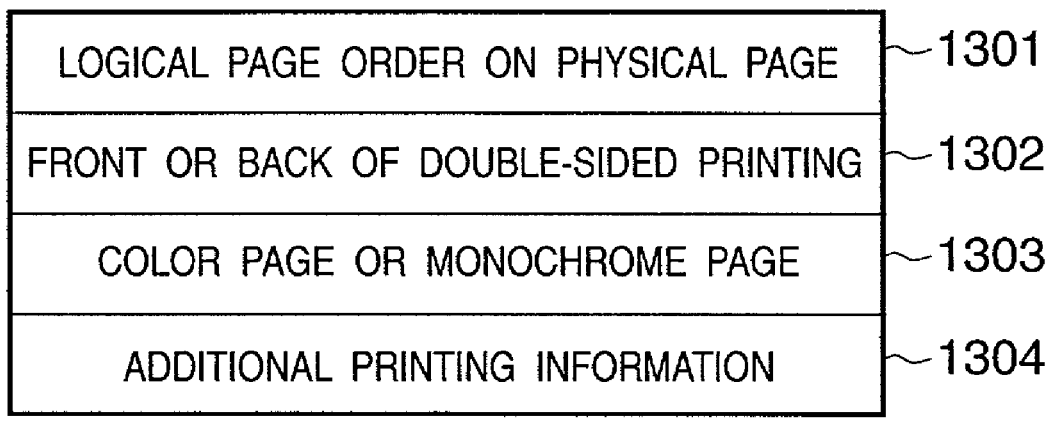
FIG. 13 illustrates an example of physical page setting information.

FIG. 13 is an example of the physical page setting information in 1202. Field 1301 indicates the order of logical pages placed on a physical page and stores the specification of the order (from top left to side, from top left to bottom, etc.) in which logical pages are placed on a physical page. Depending on the system, instead of page order, there is also a case where the setting in 1301 is replaced by rearranging the logical page information from field 1204 onward not in the page number order but in order according to the page order.

Field 1302 is information of the two sides of double-sided printing and is used, for example, to align the binding margins of the two sides. Field 1303 specifies either color page or monochrome page. In the case of a document in which color pages and monochrome pages are mixed, this value is used to print color pages in color mode and monochrome pages in monochrome mode. Including this information provides auto-color mode and allows a color printer to change processing page by page.

That is, this makes transfer control possible by turning the intermediate transfer unit (intermediate transfer drum, intermediate transfer belt) or transfer unit (transfer drum, transfer belt) a number of turns corresponding to the number of device colors for color pages, 4 turns in the case of YMCK and 1 turn in the case of black only for monochrome pages. Field 1304 is additional printing information and is used to print additional information such as the number of pages and date for physical pages. Fields are also added to the physical page setting information according to the functions of the system.

Figure 14:
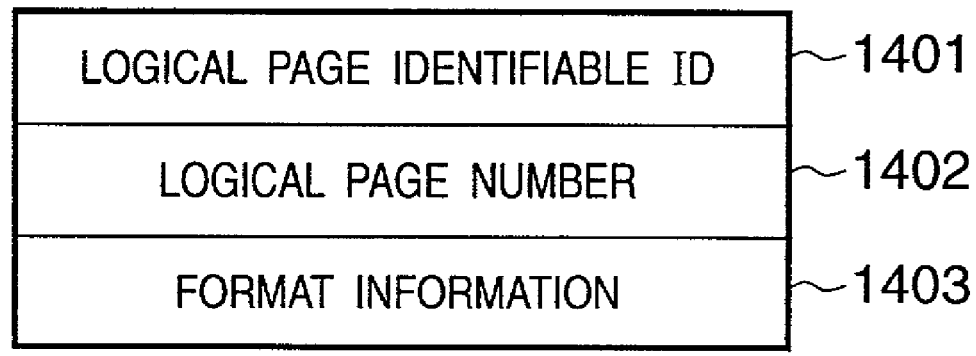
FIG. 14 illustrates an example of a data format passed from the spool file manager 304 to despooler 305 to make a request for printing of physical pages.

FIG. 14 shows an example of logical page information shown in 1204. Field 1401 is a logical page ID and this ID is used to reference an intermediate code of the page drawing file corresponding to the logical page from the spool file 303. The intermediate code of a logical page should be accessible using this ID and the ID can be a file or memory pointer or the intermediate code itself that makes up the logical page.

Field 1402 is a logical page number and is used to print the logical page number as additional information or as auxiliary information of the logical page ID. Format information of field 1403 stores various setting items specifiable in logical page units. For example, this field stores additional print information such as page frame, various setting information specified in logical page units such as expansion/contraction rate, etc. If necessary, this field can also store attribute information for logical pages such as color/monochrome information in logical page units. On the contrary, field 1403 is not necessary for a system that does not require changes of settings in logical page units or attribute information in logical page units.

The job output setting file is constructed as shown above. By the way, the job setting file also has almost the same configuration and includes a print format (one-sided, double-sided, bookbinding printing), printing layout (Nup, poster printing), additional information (watermark, date, addition of user name), number of copies, sheet size information as a job and is constructed of page order of logical pages, distinction of front or back of double-sided printing and color mode, etc. for every physical page.

Furthermore, FIG. 3 shows an example including the setting change editor 307 that has a function of changing job settings in addition to the expanded system explained so far. In this embodiment, the setting content of a job is included in the job setting file for a single job and in the job output setting file shown in FIG. 10 for a combined job and is independent of the page drawing file that stores intermediate codes, and therefore it is possible to change the job settings by re-creating the job output setting file. The setting change editor 307 implements the job setting change function by re-creating the job output setting file or rewriting part thereof singly or in conjunction with the spool file manager 304.

Figure 15:
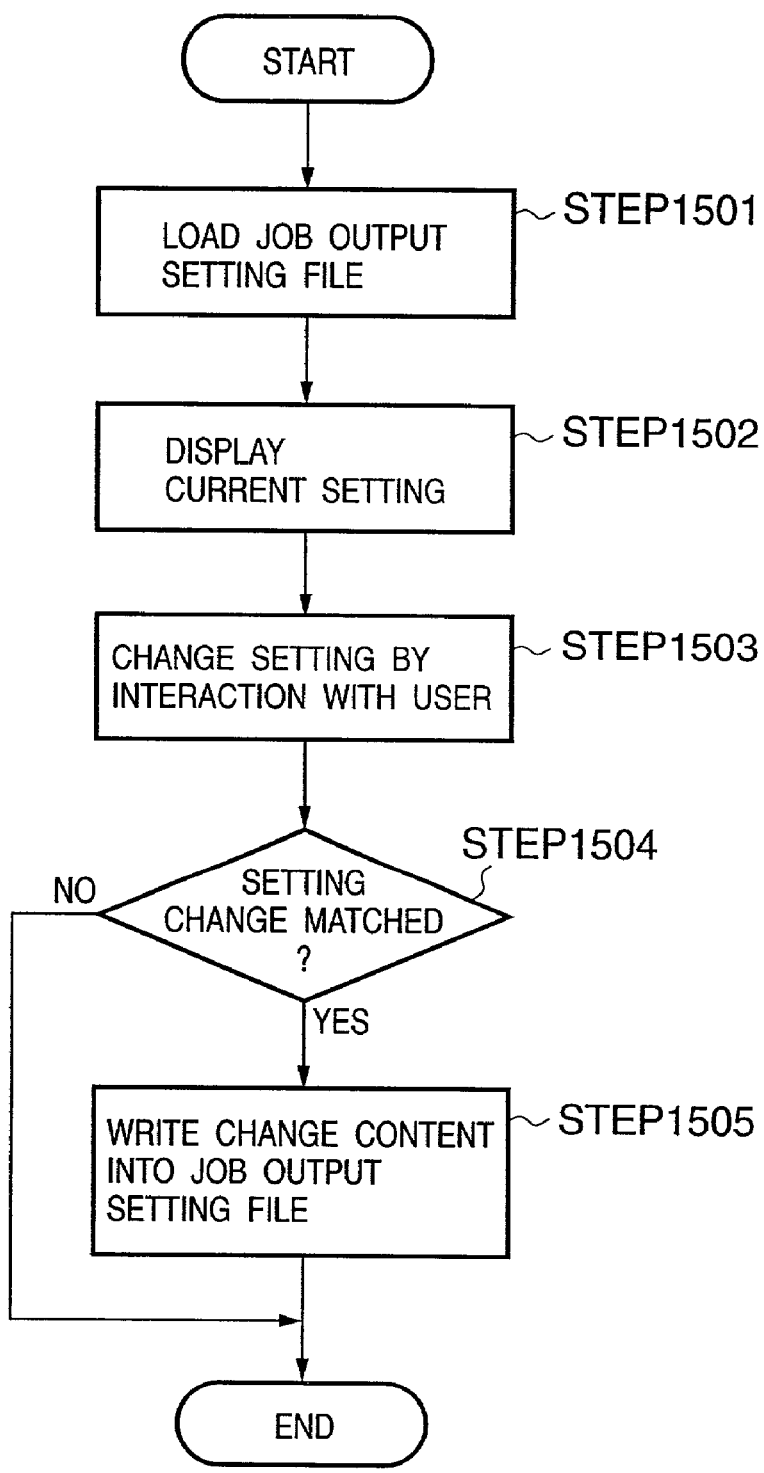
FIG. 15 is a flow chart showing setting change processing by setting change editor 307.

FIG. 15 is a flow chart showing details of the job setting change processing processes of the setting change editor 307.

First, in step 1501, the setting change editor loads the job setting file or job output setting file. The job output setting file is the same file as that loaded by the previewer 306 or despooler 305. Then, the setting change editor 307 moves on to step 1502 and displays the user the loading result.

In step 1503, the setting change editor 307 interacts with the user on the user interface and changes the setting content by the aforementioned specification of the menu, etc. This step can consist not only of the interactive format but also of a batch format that changes the setting content according to the setting change content written in a file, etc. Then, the setting change editor 307 moves on to step 1504 and judges whether there is any change between the initially loaded content and the current setting content specified in step 1501. If some change has been made to the setting content, the setting change editor 307 moves on to step 1505, creates a new job output setting file and notifies the spool file manager of the change and ends the process.

In the case where it is judged that there is no change, the setting change editor 307 notifies the spool file manager that there is no change in step 1504 and ends the process. The new job output setting file is created in this way, and if the "OK" button is selected on the user interface screen in FIG. 18, the new job output setting file becomes effective and the old job output setting file is deleted. In the case of the job setting file for a single job instead of a change from the job output setting file, the job setting file is not deleted but stored.

On the screen in FIG. 18, if the "Restore Defaults" button (1801) is selected, the new job output setting file is deleted and the old job output setting file becomes effective and is reflected in the display. This embodiment explains the setting change editor 307 as a different module, but the setting change editor 307 can also simply be part of the user interface of the spool file manager 304. Instead of the setting change editor 307 actually writing the change content into the job output setting file, it is also possible to adopt a mounting format whereby the job output setting file is actually changed by the spool file manager 304 by notifying only the content of the setting change to the spool file manager 304.

FIG. 3 illustrates the expanded system that combines a plurality of print jobs and prints it as a single print job. An expansion to despool/preview the combined job will be explained.

Normally, the spool file 303 in an intermediate format is created in job units. In the case of a single job, processing is performed by sequentially reading intermediate codes of each logical page in the processing target job file, and therefore the logical page ID of field 1401 can be provided using a relative or absolute offset that indicates the position of each logical page in the file. In the case of a combined job, it is necessary to specify the spool file and the page information that belongs to the job from the job ID of field 1401.

This embodiment adopts a method of specifying a spool file by adding the logical page ID that identifies the spool file to the logical page ID. In this case, there is no more main change than field 1401 (FIG. 14). This is because once the spool file can be identified, loading of the page part can be processed using the same logic as processing of a single job. Furthermore, if the spool file is saved in files differing from one logical page to another, there is also a method of mounting that regards the file name of the logical page as the logical page ID of field 1401 as is.

Figure 22:
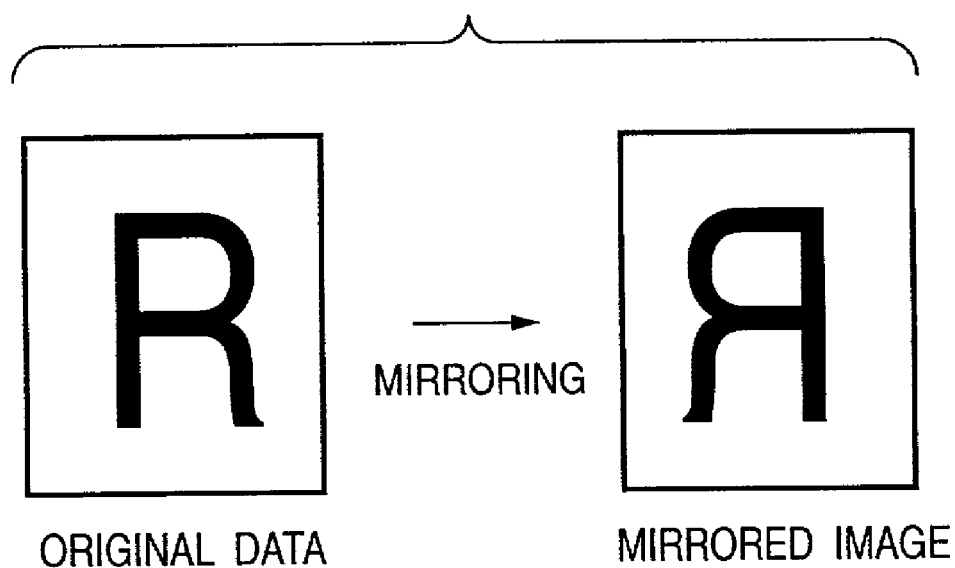
FIG. 22 illustrates a display example of right/left inversion (mirroring)

FIG. 22 is a conceptual drawing of right/left inversion (mirroring). If the original data consists of a character "R" drawn on a full sheet and mirroring is specified, the character "R" is printed with the right and left sides switched round in the same way as the character looks in the mirror.

Figure 19:
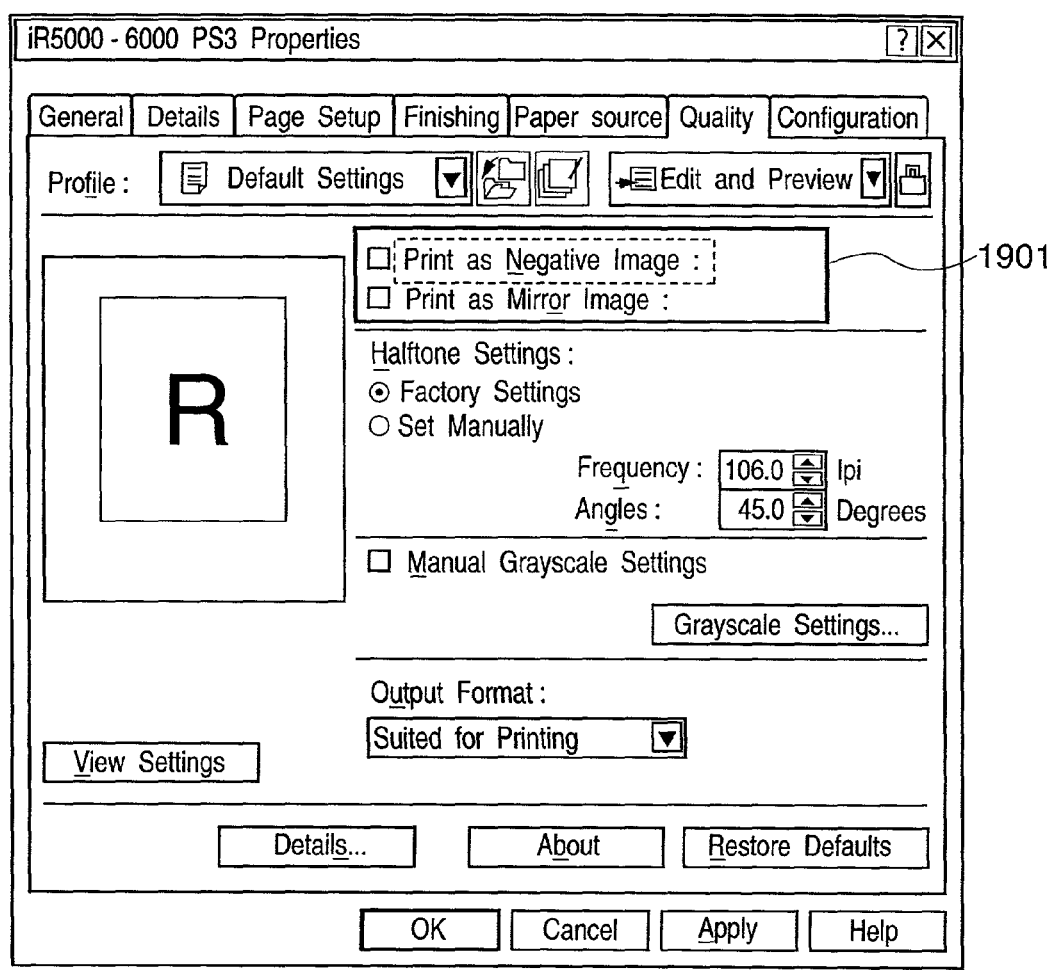
FIG. 19 illustrates an example of a print setting screen that sets negative printing and mirror printing.

When the print setting for mirroring or color inversion (negative) is performed, the dialog box to enter the print setting as shown in FIG. 19 appears and the print setting entered from this dialog box is handed over from the printer driver to the spooler 303. The setting input dialog box shown in FIG. 19 includes a setting item 1901 to set mirroring or color inversion.

Figure 20:
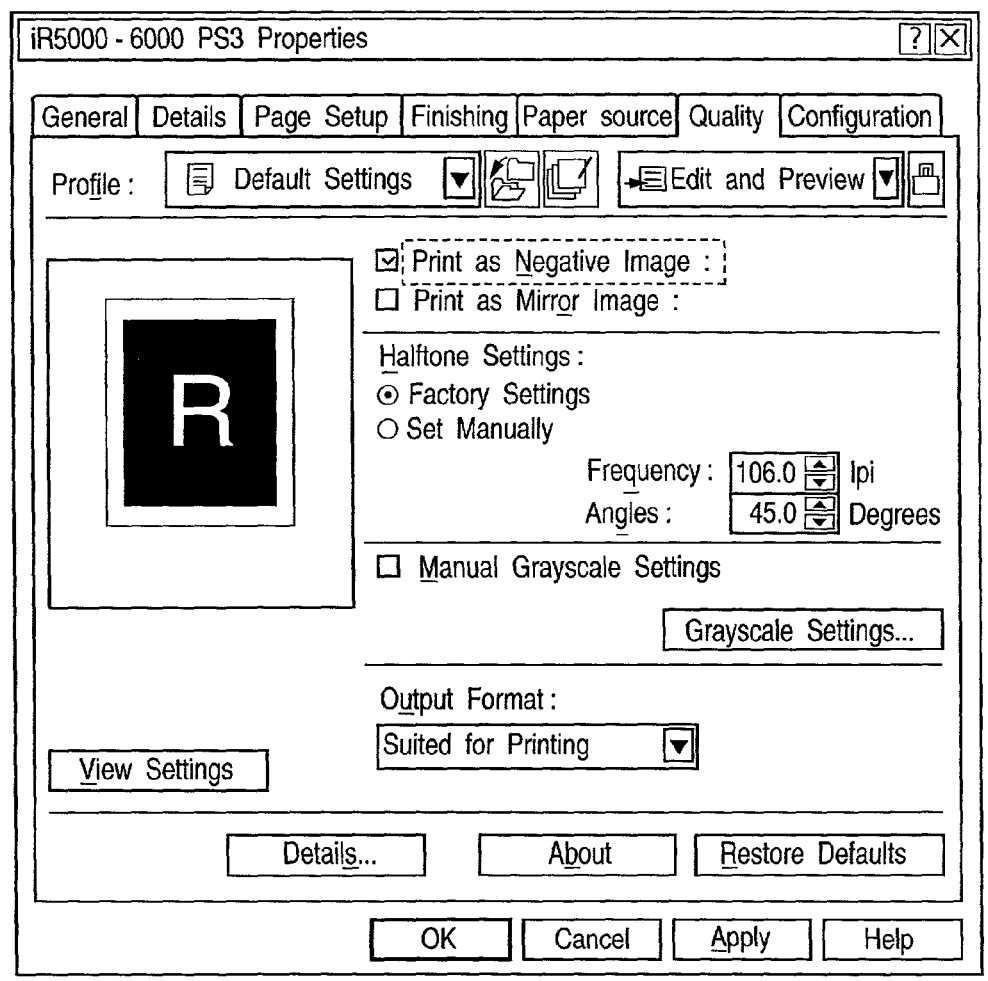
FIG. 20 illustrates an example of a case where color inversion (negative) is set on the print setting screen in FIG. 19.
Figure 21:
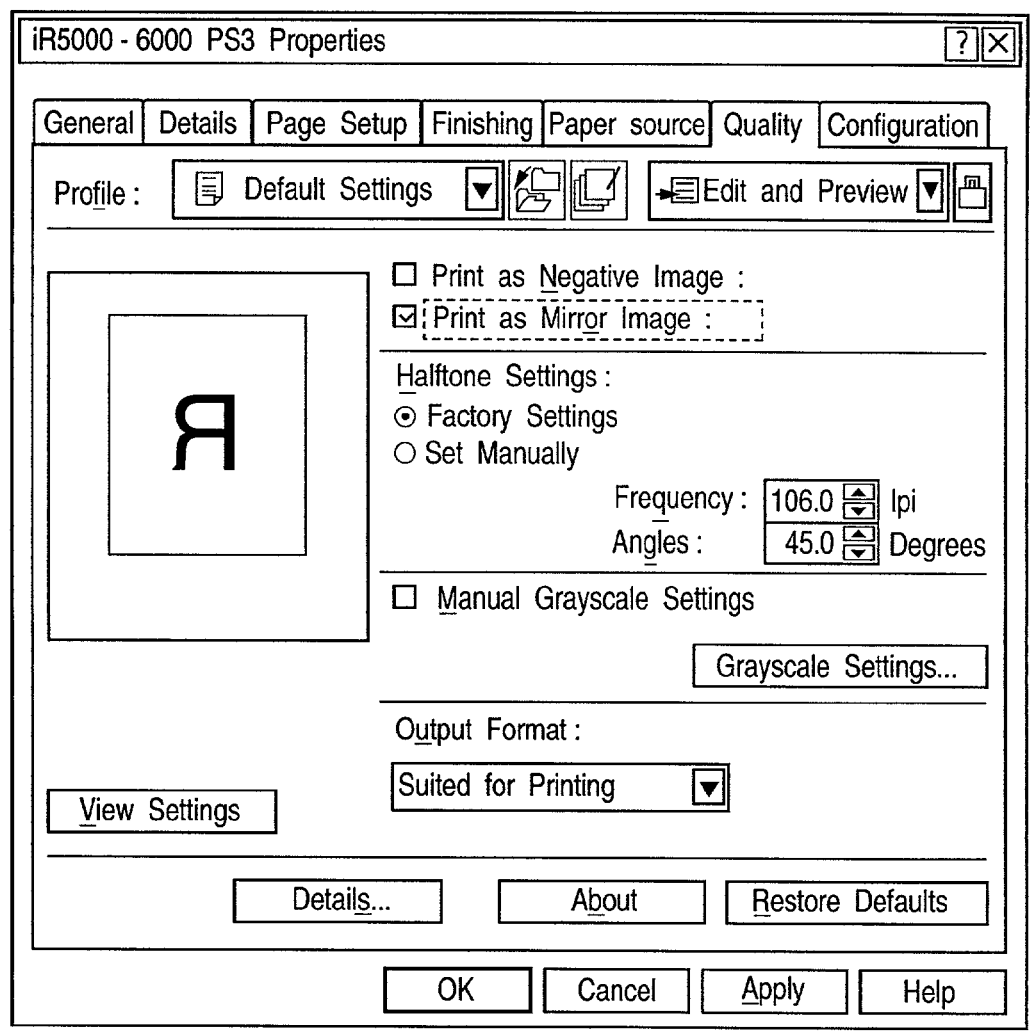
FIG. 21 illustrates an example of a case where right/left inversion (mirroring) is set on the print setting screen in FIG. 19.

Display examples when color inversion is specified and when mirroring is specified in the setting input dialog box in FIG. 19 are shown in FIG. 20 and FIG. 21 respectively. Though not shown in the examples, it is also possible to specify color inversion and mirroring at the same time.

When mirroring is specified, care is required for the display result when mirroring is specified simultaneously with a setting item that has a concept of distinction between right and left in another layout setting.

Figure 24:
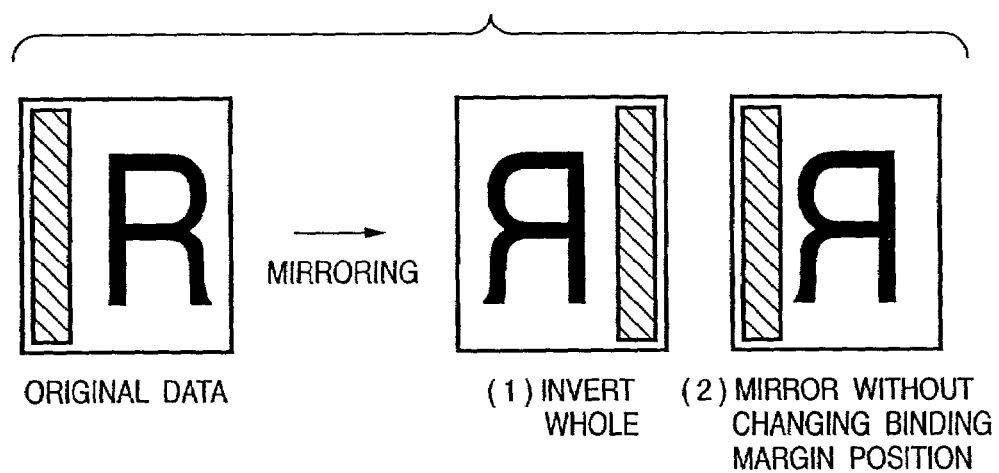
FIG. 24 is a drawing to explain a combination of right/left inversion and binding margin.

FIG. 24 shows the concept of a display format in the case where binding margins and mirroring are specified simultaneously. The original data has a binding margin (indicated with a gray rectangle) on the left side of the sheet. In this case, there can be two ways of the mirroring result.

The first one is, as shown in (1), a case where the binding margin is also mirrored as if the entire sheet was mirrored. In this case, the entire sheet is mirrored, but when the page is actually bound with a binder, the binding margin comes to the right and it is not possible to bind the page at the left. When artworks are created, it is desirable to mirror the entire sheet as illustrated here.

The second one is, as shown in (2), the orientation of the binding margin is kept and only the part of the drawing data is mirrored. When mirroring is used as a special effect, it is desirable that the binding direction be kept.

Figure 25:
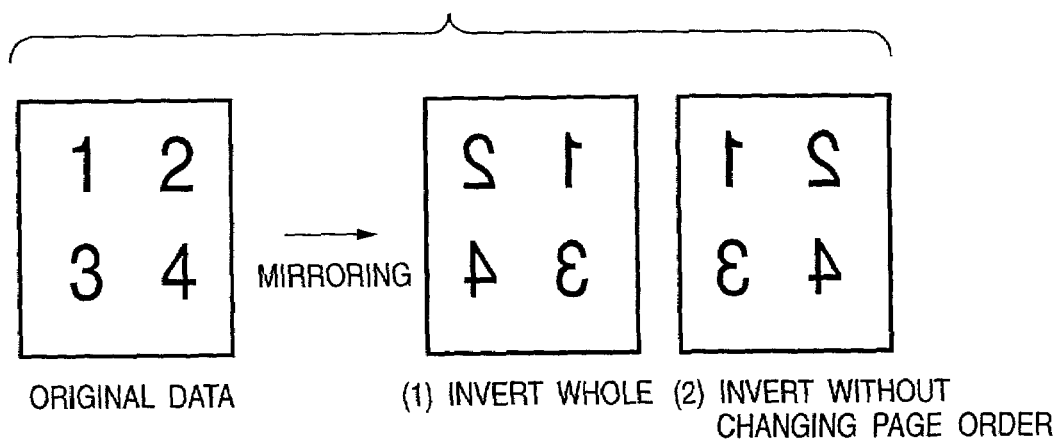
FIG. 25 is a drawing to explain a combination of right/left inversion and N-page printing.

FIG. 25 shows the concept of a display format in the case where N-page printing and mirroring are specified simultaneously. The original data sets 4-page printing whereby 4 pages of data in which a page number is displayed on one full page are printed on one sheet of paper. N-page printing involves a page order setting as to how N pages of data are arranged on a sheet. This example follows a page order in which N pages of data are arranged from the left to right and when the data is lined up to the right end, then the arrangement of the data continues on the next row. When this data is mirrored, there can be two possible ways of arrangement such as (1) the entire sheet is mirrored and (2) mirroring is applied to each of N pages while keeping the page order.

Thus, when a layout setting with a concept of distinction between right and left is combined with mirroring, there is a plurality of interpretations, and therefore the ability to preview the result on the screen is effective means for obtaining a printing result as intended by the user and the previewer must display the printing result in the same format as that of the actual printing result.

There are various preview methods; a method of extracting drawing elements one by one from an intermediate data file and drawing them on the screen or a method of converting drawing elements to image formats such as bitmap and then displaying the image data, etc. Generally, a printer has resolution of several hundreds of DPI, but a screen has resolution of only a fraction of that and even if a data image corresponding to one page is created, the amount of data is by far smaller than that of the printer. The previewer does not actually draw intermediate data on the screen every time, but is often enabled to display data at high speed by creating and displaying small image data beforehand. When the print data has image data and complicated graphic data, its effect is large in terms of both speed and amount of resources used in a computer. This embodiment will describe an example of method of creating small image data according to the resolution of the screen and then drawing the image data on the screen of the computer when a preview is presented.

Figure 26:
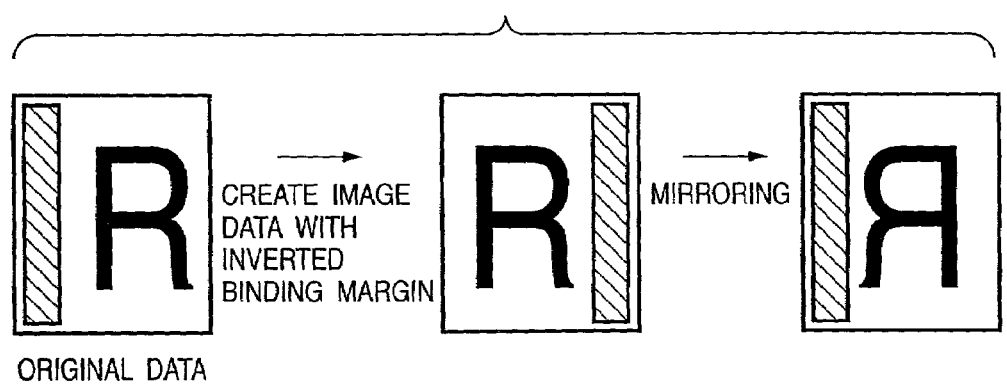
FIG. 26 illustrates display processing of a preview combining a binding margin and right/left inversion.

In this case, when the small image data is created, it is also possible to create not an inverted image but image data before being inverted and apply mirroring to the small image data when it is displayed on the screen. FIG. 26 describes the mirroring preview method.

FIG. 26 is an example of the case where (2) in FIG. 24 applies when binding margin and mirroring are set simultaneously. First, image data with the binding margin turned around is created and this entire image data is mirrored to create a mirrored image with the position of the binding margin remaining unchanged.

Figure 31:
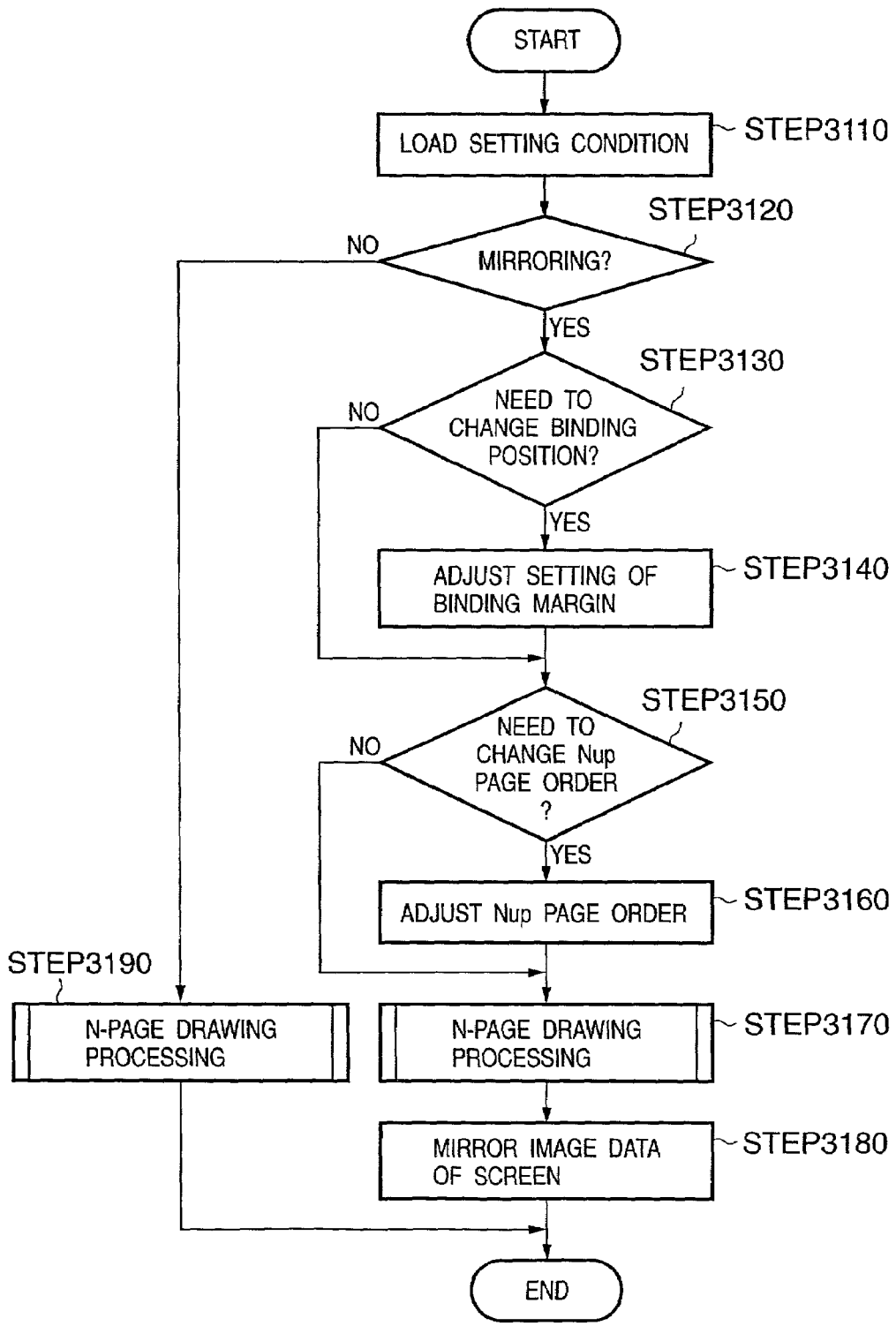
FIG. 31 is a flow chart showing an example of right/left inversion processing.

FIG. 31 is an example of flow chart that explains the flow of this processing in the previewer 306. First, in step 3110, the previewer 306 loads the setting condition from the intermediate file. Then, in step 3120, it is judged whether mirroring is specified in the setting condition loaded in step 3110 or not. If mirroring is not specified, the process moves on to step 3190 carrying out image processing of N-page processing of N-page printing as usual and the process ends.

If mirroring is specified in step 3120, the process advances to step 3130 judging whether it is necessary to adjust the setting of the binding margin or not. In the case of method (1) in FIG. 24 concerning the binding margin and mirroring, the setting of the binding margin need not be adjusted. In the case of method (2) in FIG. 24, the process advances to step 3140 to create an image with the position of the binding margin adjusted and makes an adjustment in such a way that the right and left settings of the binding margin are turned around.

Then, the process advances to step 3150 and judges whether it is necessary to adjust the page order of N-page printing needs to be adjusted or not. When preview image data is created in sheet units and the page order is mirrored in the entire sheet as shown in (1) of FIG. 25, no positional adjustment is required. In this case, the process moves on to step 3170. When it is judged that the page order needs to be adjusted in step 3150, the process moves on to step 3160 and the setting of the page order is adjusted for a preview. Then, in step 3170, drawing processing corresponding to normal N pages is performed and a preview image is created. Then, when there is a need to draw the image on the screen, the process moves on to step 3180, mirrors and displays the image data.

The processing has been explained using an example of a system in which image data is created in sheet units, but in the case where the preview image data is created for every logical page, the judgment criteria for adjusting the binding margin and page order may be different. The judgment criteria in step 3130 and step 3150 may also vary depending on whether the specification of the binding margin and N-page printing is a specification that the entire sheet is inverted ((1) of FIG. 24 and FIG. 25) or a specification that the binding margin and page order are saved and printed ((2) of FIG. 24 and FIG. 25).

Figure 29:
FIG. 29 illustrates an example of preview display of right/left inversion.
Figure 32:
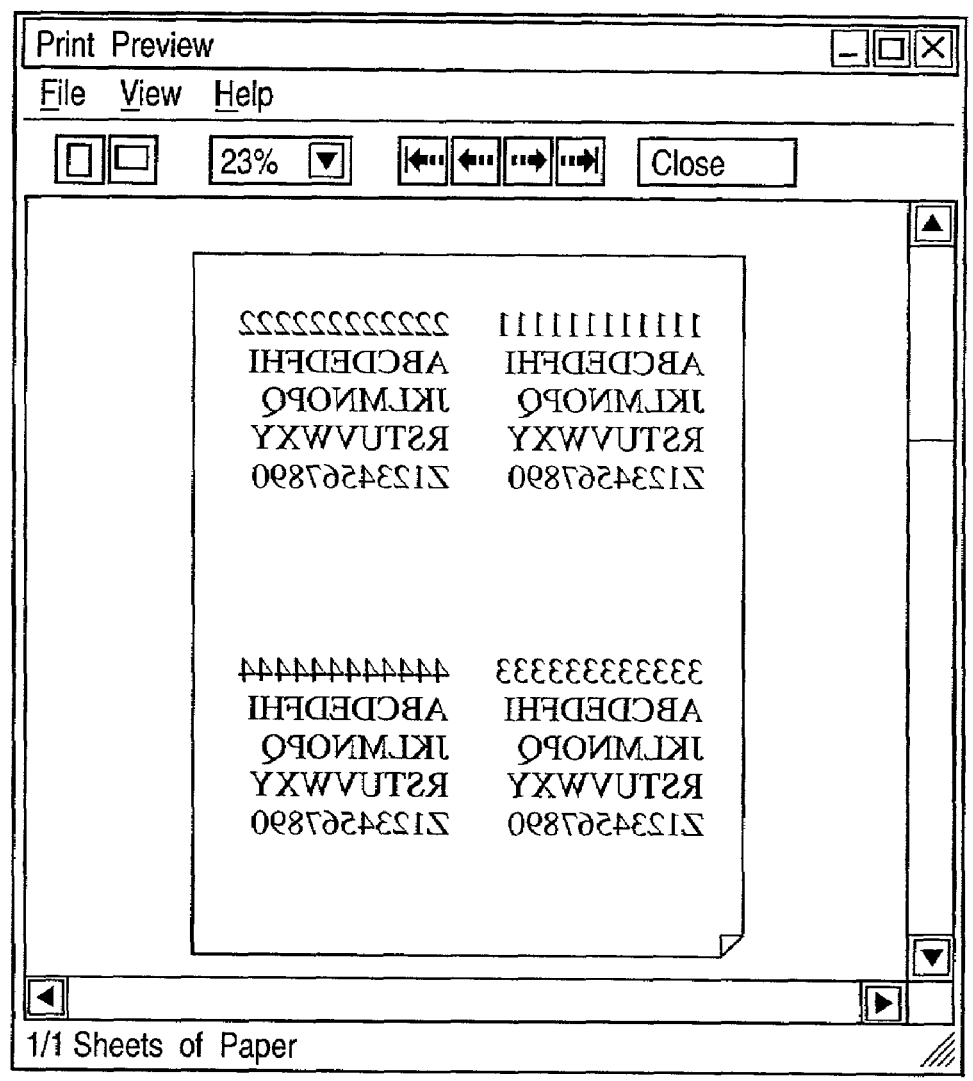
FIG. 32 illustrates an example of right/left inversion preview display.

FIG. 29 and FIG. 32 show examples of cases where the mirroring-specified data is actually displayed by the previewer. FIG. 29 is a preview in the case where mirroring is simply specified as the print setting. FIG. 32 is an example of the case where 4-page printing and mirroring are specified as the print setting.

Figure 23:
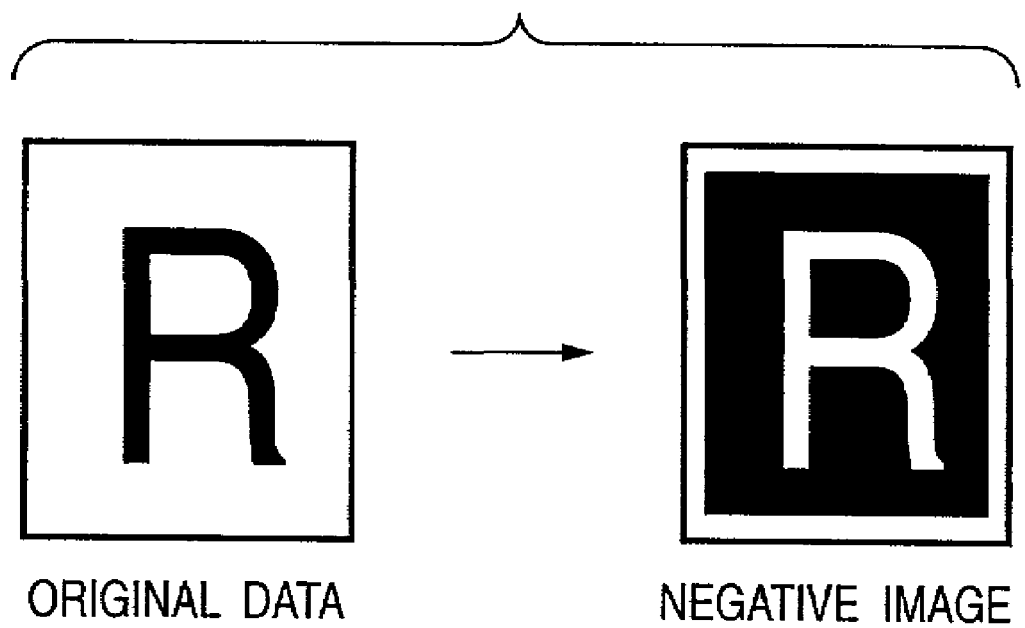
FIG. 23 illustrates a display example of color inversion (negative)

Then, an example of color inversion will be explained. FIG. 23 is a conceptual drawing of color inversion (negative). When the original data consists of a black character "R" drawn on a white background, a white character "R" is drawn on a black background. Normally, a printer has an area that cannot be printed at the ends of four sides of paper for reasons related to the sheet feeding mechanism, and therefore these parts remain white even if an attempt is made to paint these parts in black by color inversion. Thus, to correctly display a negative image, it is necessary to present a preview taking into account this area that cannot be printed.

Figure 28:
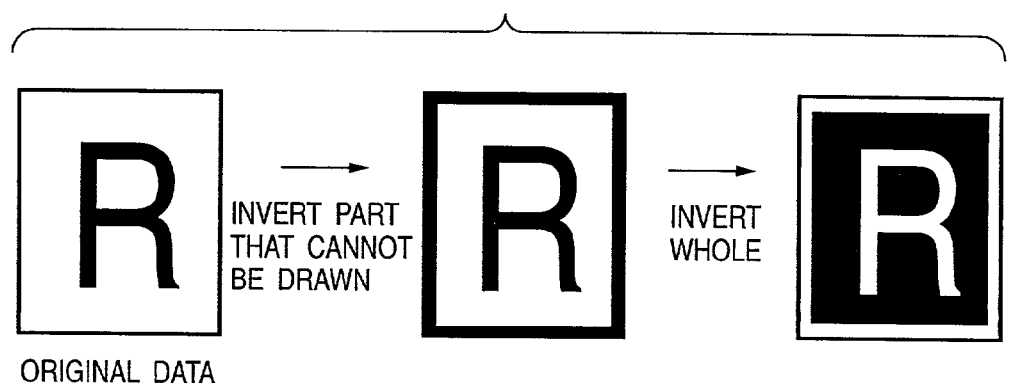
FIG. 28 illustrates an example of display processing of a color inverted preview taking into account areas that cannot be drawn.

FIG. 28 is a drawing to explain the color inversion preview system and shows an example of creating the entire sheet as image data. After drawing the original data on image data of a virtual sheet, image data is created by inverting the parts of the four sides that cannot be printed by paper feeding of the printer. When this data is drawn on the screen, if data is drawn by specifying inversion through a raster operation, it is possible to display a stricter preview that also expresses areas that cannot be drawn as shown rightmost.

Figure 30:
FIG. 30 illustrates an example of preview display of color inversion.

FIG. 30 shows an example of actual preview display. This is an example of applying color inversion to the data in FIG. 29 and shows a preview of a state in which the four sides of the sheet remain without being inverted.

Figure 27:
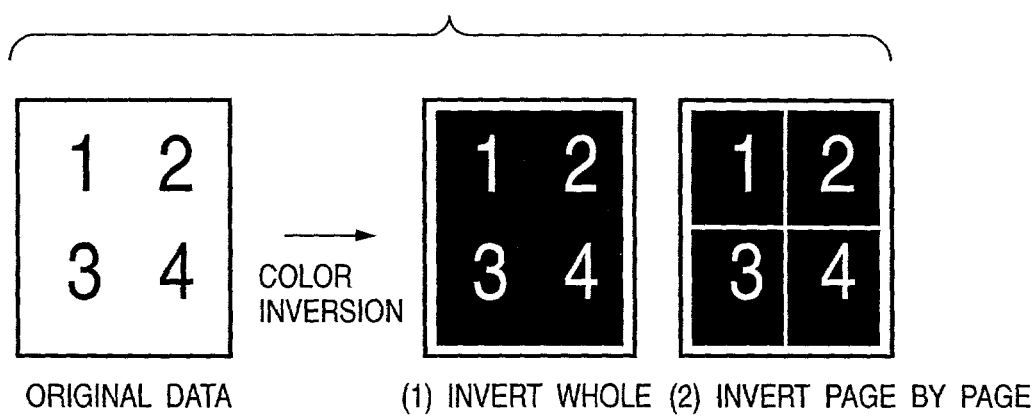
FIG. 27 illustrates a display example of combining color inversion and N-page printing.

In the case of color inversion, the entire printable area is normally color-inverted, but as shown in (2) of FIG. 27, if N-page printing is combined with color inversion, there may be a case where gaps of N pages placed on the sheet are not inverted. Likely, there can also be a specification that the binding margins are not inverted but left in white. Though depending on the preview system, if the preview system is such that a preview image is created for every logical page of N-page printing and placed on the sheet display on the screen, then page gaps are left without being inverted as shown in (2) of FIG. 27, and therefore it is necessary to invert the gaps in the same way as for the unprintable area.

FIG. 33 shows a flow chart to explain an example of processing of a color inversion preview. First, in step 3310, a print setting condition is loaded from an intermediate file through normal processing. Then, the process moves on to step 3320 and image data for a sheet preview is created according to the print setting condition loaded in step 3310. Then, the process moves on to step 3330 and it is judged whether color inversion is specified in the print setting in the intermediate file or not. If color inversion is specified in step 3330, the process moves on to step 3340 and information on the unprintable area of the printer is acquired.

In this embodiment, it is possible to acquire this information from the printer driver 203 via the graphic engine 202 by invoking the GDI function. Then, the process moves on to step 3350, the unprintable area acquired in step 3340 is inverted. Then, the process moves on to step 3360 and the image is inverted. If it is judged in step 3330 that color inversion is not specified, the process moves on to step 3370 and display processing on a normal screen is performed.

In this example, non-color-inverted image data is created and color-inverted when actually previewed on the screen, but similar effects will be obtained with a method of creating color-converted image data and performing normal drawing on the screen.

[Other Embodiments]

The embodiment according to the present invention is applicable to a system made up of a plurality of devices (e.g., host computer, interface device, reader, printer, etc.) or to an apparatus made up of a single device (copier, printer, facsimile apparatus, etc.).

Furthermore, the object of the present invention can also be attained by a computer (or CPU or MPU) of a system or apparatus reading and executing software program codes that implement the functions of the aforementioned embodiment from a storage medium that stores the program codes.

In this case, the program codes read from the storage medium themselves implement functions of the aforementioned embodiment and the storage medium that stores the program codes constitutes the present invention.

There are various storage media used to supply program codes such as a floppy disk, hard disk, optical disk, magneto-optical disk, CD-ROM, CD-R, magnetic tape, nonvolatile memory card, ROM, etc.

Furthermore, the present invention includes not only a case where executing the program codes read by the computer implements the functions of the aforementioned embodiments but also a case where the OS (operating system), etc. operating on the computer performs part or the whole of actual processing based on instructions of the program codes and this processing implements the functions of the aforementioned embodiments.

Furthermore, the present invention also includes a case where the program codes read from the storage medium are written into memory provided with a functional expansion board inserted into the computer or a functional expansion unit connected to the computer, and then a CPU, etc. incorporated in the functional expansion board or functional expansion unit performs part or the whole of actual processing based on an instruction of the program code, and thereby attaining the functions of the aforementioned embodiment.

Furthermore, the object of the present invention can also be attained by installing the software program codes that implement the functions of the aforementioned embodiment in a computer (or CPU or MPU) of a system or apparatus and reading and executing the installed program codes.

In this case, the program codes downloaded and installed through download services, etc. of the Internet themselves implement the functions of the aforementioned embodiment and the program codes themselves constitute the present invention.

As described above, the present invention allows even special printer effects such as mirroring to be previewed on the host computer.

Furthermore, the present invention also allows special printer effects such as color inversion to be previewed on the host computer.

As many apparently widely different embodiments of the present invention can be made without departing from the spirit and scope thereof, it is to be understood that the invention is not limited to the specific embodiments thereof except as defined in the claims.

What is claimed is:

1. An information processing apparatus that creates a print job to be printed by a printing apparatus having an inversion process function, comprising:
   a receiving unit adapted to receive print data from an operating system in response to printout from an application;
   an intermediate data converting unit adapted to convert said print data received via the operating system from the application to an intermediate code format data and to store said converted intermediate code format data and processing conditions of said print data;
   an analysis unit adapted to analyze the processing conditions and to determine whether or not the inversion process function to be executed by the printing apparatus is set in the processing conditions;
   an inversion-type determination unit adapted to determine whether an entire print sheet is to be inverted or each page of the intermediate code format data is to be inverted with keeping an arrangement of each page;
   a preview display controlling unit adapted to display a preview image representing a print sheet printed by the printing apparatus, based on the print data stored by said intermediate data converting unit and the stored processing conditions; and
   a job creation unit adapted to create the print job based on the intermediate code format data stored by said intermediate data converting unit, after said preview display controlling unit displays the preview image,
   wherein the intermediate code format data is used for both the preview image and the print job, and
   wherein said preview display controlling unit displays the preview image representing the print sheet where the arranaement of each page is kept and each page is inverted, in a case where said analysis unit determines that the inversion process function is set in the processing conditions and said inversion-type determination unit determines that each page of the intermediate code format data is to be inverted, and
   wherein said preview display controlling unit displays the preview image representing the print sheet where the entire print sheet is inverted, in a case where said analysis unit determines that the inversion process function is set in the processing conditions and said inversion-type determination unit determines that the entire print sheet is to be inverted.

2. The information processing apparatus according to claim 1, further comprising an editing unit adapted to edit the data stored and converted to the intermediate code format data by said intermediate data converting unit or processing conditions of said print data; and
   a data creating unit adapted to create print data and processing conditions that implement print processing different from the print data created by said application based on the data edited by said editing unit,
   wherein when a plurality of intermediate code format print data is stored, said editing unit combines said plurality of intermediate code format print data into a single combined job.

3. The information processing apparatus according to claim 1, wherein said preview display controlling unit acquires layout information from said stored intermediate code format data and previews said print sheet printed by the printing apparatus based on said layout information.

4. The information processing apparatus according to claim 2, wherein when a mirroring condition is specified for said stored intermediate code format data, said preview display controlling unit makes it possible to preview the data in a mirrored display format based on the editing result from said editing unit.

5. The information processing apparatus according to claim 2, wherein when color inversion is specified for said stored intermediate code format data, said preview display controlling unit makes it possible to preview the data in a color-inverted display format based on the editing result from said editing unit.

6. The information processing apparatus according to claim 2, wherein when said editing unit combines a plurality of jobs, said preview display controlling unit makes it possible to present a preview in a display format in which said combined job is displayed as a single job.

7. The information processing apparatus according to claim 2, further comprising a print data controlling unit adapted to judge whether the print data is created by said application or by said data creating unit and controlling the output destination of the print data.

8. The information processing apparatus according to claim 1, wherein said print data controlling unit releases the occupation of the application after said intermediate data converting unit stores the converted data.

9. The information processing apparatus according to claim 1, wherein said intermediate code format data converted by said intermediate data converting unit is data that can be edited in accordance with expansion, contraction, layout display, mirroring and color inversion.

10. The information processing apparatus according to claim 2, wherein the processing of combining the print data by said editing unit, the stored data is identified based on identification information obtained by adding an ID to identify the stored data to the logical page ID of said stored data.

11. An information processing method for creating print job to be printed by a printing apparatus having an inversion process function, comprising:
   a receiving step of receiving print data from an operating system in response to a printout from an application;
   an intermediate data converting step of converting said print data received via the operating system from the application to an intermediate code format data and storing said converted intermediate code format data and processing conditions of said print data;
   an analyzing step of analyzing the processing conditions and determining whether or not the inversion process function to be executed by the printing apparatus is set in the processing conditions;
   an inversion-type determination step of determining whether an entire print sheet is to be inverted or each page of the intermediate code format data is to be inverted with keeping an arrangement of each page;
   a preview display controlling step of displaying a preview image representing a print sheet printed by the printing apparatus, based on the print data stored in said intermediate data converting step and the stored processing conditions; and
   a job creation step of creating the print job based on the intermediate code format data stored in said intermediate data converting step, after said preview display controlling step displays the preview image,
   wherein the intermediate code format data is used for both the preview image and the print job, and
   wherein said preview display controlling step displays the preview image representing the print sheet where the arrangement of each page is kept and each page is inverted, in a case where said analysis step determines that the inversion process function is set in the processing conditions and said inversion-type determination step determines that each page of the intermediate code format data is to be inverted, and
   wherein said preview display controlling step displays the preview image representing the print sheet where the entire print sheet is inverted, in a case where said analysis step determines that the inversion process function is set in the processing conditions and said inversion-type determination step determines that the entire print sheet is to be inverted.

12. The information processing method according to claim 11, further comprising:
   an editing step of editing the data stored and converted to the intermediate code format data in said intermediate data converting step or processing conditions of said print data; and
   a data creating step of creating print data and processing conditions that implement print processing different from the print data created by said application based on the data edited in said editing step,
   wherein when a plurality of intermediate code format print data is stored, said editing step combines said plurality of intermediate code format print data into a single combined job.

13. The information processing method according to claim 11, wherein said preview display controlling step acquires layout information from said stored intermediate code format data and executes processing for previewing said print sheet printed by the printing apparatus based on said layout information.

14. The information processing method according to claim 12, wherein when a mirroring condition is specified for said stored intermediate code format data, said preview display controlling step makes it possible to preview the data in a mirrored display format based on the editing result from said editing step.

15. The information processing method according to claim 12, wherein when color inversion is specified for said stored intermediate code format data, said preview display controlling step makes it possible to preview the data in a color-inverted display format based on the editing result from said editing step.

16. The information processing method according to claim 12, wherein when said editing step combines a plurality of jobs, said preview display controlling step makes it possible to present a preview in a display format in which said combined job is displayed as a single job.

17. The information processing method according to claim 12, comprising a print data controlling step of judging whether the print data is created by said application or by processing in said data creating step and controlling the output destination of the print data.

18. The information processing method according to claim 11, wherein said print data controlling step releases the occupation of the application after said intermediate data converting step stores the converted data.

19. The information processing method according to claim 11, wherein said intermediate code format data converted by said intermediate data converting step is data that can be edited in accordance with expansion, contraction, layout display, mirroring and color inversion.

20. The information processing method according to claim 12, wherein in the processing of combining the print data in said editing step, the stored data is identified based on identification information obtained by adding an ID to identify the stored data to the logical page ID of said stored data.

21. A computer-readable storage medium that stores a program module for a computer to execute an information processing method for creating print job to be printed by a printing apparatus having an inversion process function, said program module comprising:
   a receiving module that receives print data from an operating system in response to printout from an application;
   an intermediate data conversion module that converts said print data received via the operating system from the application to an intermediate code format data and stores said converted intermediate code format data and processing conditions of said print data;
   an analysis module that analyzes the processing conditions and determines whether or not the inversion process function to be executed by the printing apparatus is set in the processing conditions;
   an inversion-type determination module that determines whether an entire print sheet is to be inverted or each page of the intermediate code format data is to be inverted with keeping an arrangement of each page;

a preview display control module that displays a preview image representing a print sheet printed by the printing apparatus, based on the print data stored by said intermediate data converting module and the stored processing conditions; and a job creation module that creates the print job based on the intermediate code format data stored by said intermediate data converting module, after said preview display control module displays the preview image, wherein the intermediate code format data is used for both the preview image and the print job, and wherein said preview display controlling module displays the preview image representing the print sheet where the arrangement of each page is kept and each page is inverted, in a case where said analysis module determines that the inversion process function is set in the processing conditions and said inversion-type determination module determines that each page of the intermediate code format data is to be inverted, and wherein said preview display controlling module displays the preview image representing the print sheet where the entire print sheet is inverted, in a case where said analysis module determines that the inversion process function is set in the processing conditions and said inversion-type determination module determines that the entire print sheet is to be inverted.

22. The storage medium according to claim 21, further comprising:

an editing module that edits the data stored and converted to the intermediate code format data by said intermediate data converting module or processing conditions of said print data; and a data creating module that creates print data and processing conditions that implement print processing different from the print data created by said application based on the data edited by said editing module, wherein when a plurality of intermediate code format print data is stored, said editing module combines said plurality of intermediate code format print data into a single combined job.

23. The storage medium according to claim 21, wherein said preview display control module acquires layout information from said stored intermediate code format data and performs processing to preview said print sheet printed by the printing apparatus based on said layout information.

24. The storage medium according to claim 22, wherein when a mirroring condition is specified for said stored intermediate code format data, said preview display control module makes it possible to preview the data in a mirrored display format based on the editing result from said editing module.

25. The storage medium according to claim 22, wherein when color inversion is specified for said stored intermediate code format data, said preview display control module makes it possible to preview the data in a color-inverted display format based on the editing result from said editing module.

26. The storage medium according to claim 22, wherein when said editing means combines a plurality of jobs, said preview display control module makes it possible to present a preview in a display format in which said combined job is displayed as a single job.

27. The storage medium according to claim 22, comprising a print data control module that judges whether the print data is created by said application or by processing of said data creation module and controls the output destination of the print data.

28. The storage medium according to claim 21, wherein said print data control module releases the occupation of the application after said intermediate data conversion module stores the converted data.

29. The storage medium according to claim 21, wherein said intermediate code format data converted by said intermediate data conversion module is data that can be edited in accordance with expansion, contraction, layout display, mirroring and color inversion.

30. The storage medium according to claim 22, wherein in the processing of combining the print data by said editing module, the stored data is identified based on identification information obtained by adding an ID to identify the stored data to the logical page ID of said stored data.

31. An information processing apparatus that creates print data, comprising:

a spooling unit adapted to store print data created by an application;

a determining unit adapted to determine whether mirroring setting is set as print setting for the print data;

a preview display controlling unit adapted, in a case where said determining unit determines that the mirroring setting is set, to create mirrored display data based on the print data stored by said spooling unit and to present a preview; and a mirroring unit determining unit adapted, in a case where mirroring setting is set as the print setting for the print data and a Nup setting for placing N logical pages on one physical page is set, to determine whether the mirrored display data is to be created in unit of a logical page or the mirrored display data is to be created in unit of a physical page, wherein in a case where said mirroring unit determining unit determines that the mirrored display data to be created in unit of the logical page, said preview display controlling unit creates the mirrored display data for placing the mirrored image of each logical page without changing an arrangement order of each logical page to be placed on the physical page, and wherein in a case where said mirroring unit determining unit determines that the mirrored display data is to be created in unit of the physical page, said preview display controlling unit creates the mirrored display data for the mirrored image of the physical page on which each logical page is placed.

32. An information processing method for creating print data, comprising:

a spooling step of storing print data created by an application;

a determining step of determining whether mirroring setting is set as print setting for the print data;

a preview display controlling step of, in a case where said determining step determines that the mirroring setting is set, creating mirrored display data based on the print data stored in said spooling step and presenting a preview; and a mirroring unit determining step of, in a case where the mirroring setting is set as the print setting for the print data and a Nup setting for placing N logical pages on one physical page is set, determining whether the mirrored display data is to be created in unit of a logical page or the mirrored display data is to be created in unit of a physical page, wherein in a case where said mirroring unit determining step determines that the mirrored display data to be created in unit of the logical page, said preview display controlling step creates the mirrored display data for placing the mirrored image of each logical page without changing an arrangement order of each logical page to be placed on the physical page, and wherein in a case where said mirroring unit determining step determines that the mirrored display data is to be created in unit of the physical page, said preview display controlling step creates the mirrored display data for the mirrored image of the physical page on which each logical page is placed.

33. A computer-readable storage medium that stores a program module for a computer to execute an information processing method for creating print data, said program module comprising:

a spooling module for storing print data created by an application;

a determining module for determining whether mirroring setting is set as the print setting for the print data;

a preview display controlling module for, in a case where said determining module determines that the mirroring setting is set, creating mirrored display data based on the print data stored by said spooling module and presenting a preview; and a mirroring unit determining module for, in a case where the mirroring setting is set as the print setting for the print data and a Nup setting for placing N logical pages on one physical page is set, determining whether the mirrored display data to be created in unit of a logical page or the mirrored display data is to be created in unit of a physical page, wherein in a case where said mirroring unit determining module determines that the mirrored display data to be created in unit of the logical page, said preview display controlling module creates the mirrored display data for placing the mirrored image of each logical page without changing an arrangement order of each logical page to be placed on the physical page, and wherein in a case where said mirroring unit determining module determines that the mirrored display data is to be created in unit of the physical page, said preview display controlling module creates the mirrored display data for the mirrored image of the physical page on which each logical page is placed.

34. A computer-program stored on a computer-readable storage medium, which is executed by a computer, comprising:

a spooling step of storing print data created by an application;

a determining step of determining whether mirroring setting is set as print setting for the print data;

a preview display controlling step of, in a case where said determining step determines that the mirroring setting is set, creating mirrored display data based on the print data stored in said spooling step and presenting a preview; and a mirroring unit determining step of, in a case where the mirroring setting is set as the print setting for the print data and a Nup setting for placing N logical pages on one physical page is set, determining whether the mirrored display data to be created in unit of a logical page or the mirrored display data is to be created in unit of a physical page, wherein in a case where said mirroring unit determining step determines that the mirrored display data to be created in unit of the logical page, said preview display controlling step creates the mirrored display data for placing the mirrored image of each logical page without changing an arrangement order of each logical page to be placed on the physical page, and wherein in a case where said mirroring unit determining step determines that the mirrored display data is to be created in unit of the physical page, said preview display controlling step creates the mirrored display data for the mirrored image of the physical page on which each logical page is placed.

* * * * *

UNITED STATES PATENT AND TRADEMARK OFFICE
CERTIFICATE OF CORRECTION

PATENT NO.         : 7,161,711 B2
APPLICATION NO. : 09/924724
DATED                  : January 9, 2007
INVENTOR(S)       : Mori et al.

It is certified that error appears in the above-identified patent and that said Letters Patent is hereby corrected as shown below:

SHEET 1:
FIG. 1, "INTPUT" should read -- INPUT --.

COLUMN 3:
Line 22, "is" should read -- are --.

COLUMN 5:
Line 6, "computer-program" should read -- computer program --; and
Line 6, "are" should read -- is --.

COLUMN 7:
Line 66, "$RAM_2$" should read -- RAM 2 --.

COLUMN 9:
Line 48, "Moreover," should read -- Moreover, if --; and
Line 67, "operations," should read -- operations: --.

COLUMN 10:
Line 4, "crate" should read -- create --.

COLUMN 13:
Line 29, "20 CS" should read -- 20CS --;
Line 30, "20 CB" should read -- 20CB --; and
Line 32, "20 CS" should read -- 20CS --.

COLUMN 22:
Line 14, "the mirroring" should read -- mirroring the --;
Line 47, "methods;" should read -- methods: --; and
Line 61, "of" should read -- of a --.

COLUMN 23:
Line 10, "of" should read -- of a --; and
Line 30, Delete "needs to be adjusted".

COLUMN 26:
Line 12 claim 1, "arranaement" should read -- arrangement --.

COLUMN 27:
Line 14 claim 11, "creating" should read -- creating a --.

UNITED STATES PATENT AND TRADEMARK OFFICE
CERTIFICATE OF CORRECTION

PATENT NO. : 7,161,711 B2
APPLICATION NO. : 09/924724
DATED : January 9, 2007
INVENTOR(S) : Mori et al.

It is certified that error appears in the above-identified patent and that said Letters Patent is hereby corrected as shown below:

COLUMN 28:
Line 50 claim 21, "creating" should read -- creating a --.

COLUMN 31:
Line 31 claim 33, "data" should read -- data is --.

COLUMN 32:
Line 7 claim 34, "computer-program" should read -- computer program --; and
Line 23 claim 34, "data" should read -- data is --.

Signed and Sealed this

Ninth Day of October, 2007

JON W. DUDAS
*Director of the United States Patent and Trademark Office*